United States Patent
Lin et al.

(10) Patent No.: US 11,605,214 B2
(45) Date of Patent: *Mar. 14, 2023

(54) METHOD, DEVICE AND STORAGE MEDIUM FOR DETERMINING CAMERA POSTURE INFORMATION

(71) Applicant: Tencent Technology (Shenzhen) Company Limited, Shenzhen (CN)

(72) Inventors: Xiangkai Lin, Shenzhen (CN); Linchao Bao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 158 days.

This patent is subject to a terminal disclaimer.

(21) Appl. No.: 17/183,200

(22) Filed: Feb. 23, 2021

(65) Prior Publication Data

US 2021/0174124 A1    Jun. 10, 2021

Related U.S. Application Data

(63) Continuation of application No. 16/386,143, filed on Apr. 16, 2019, now Pat. No. 10,963,727, which is a (Continued)

(30) Foreign Application Priority Data

Jul. 7, 2017    (CN) .......................... 201710552105.1

(51) Int. Cl.
*G06V 10/44*    (2022.01)
*G06T 5/20*    (2006.01)
(Continued)

(52) U.S. Cl.
CPC .......... *G06V 10/443* (2022.01); *G06T 3/0006* (2013.01); *G06T 3/0012* (2013.01);
(Continued)

(58) Field of Classification Search
None
See application file for complete search history.

(56) References Cited

U.S. PATENT DOCUMENTS 10,963,727 B2 *   3/2021   Lin ......................... G06T 7/269
2006/0232569 A1   10/2006   Lin et al.
(Continued)

FOREIGN PATENT DOCUMENTS

CN    102088569 A    6/2011
CN    103649998 A    3/2014
(Continued)

OTHER PUBLICATIONS

Tencent Technology, ISRWO, PCT/CN2018/093418, Oct. 8, 2018, 7 pgs.

(Continued)

*Primary Examiner* — Leon Flores
(74) *Attorney, Agent, or Firm* — Morgan, Lewis & Bockius LLP

(57) ABSTRACT

Embodiments of this application disclose a method for determining camera pose information of a camera of a mobile terminal. The method includes: obtaining a first image, a second image, and a template image, the first image being a previous frame of image of the second image, the first image and the second image being images including a respective instance of the template image captured by the mobile terminal using the camera at a corresponding spatial position; determining a first homography between the template image and the second image; determining a second homography between the first image and the second image;

(Continued)

and performing complementary filtering processing on the first homography and the second homography, to obtain camera pose information of the camera, wherein the camera pose information of the camera represents a spatial position of the mobile terminal when the mobile terminal captures the second image using the camera.

20 Claims, 12 Drawing Sheets

Related U.S. Application Data continuation of application No. PCT/CN2018/093418, filed on Jun. 28, 2018.

(51) Int. Cl.
    *G06T 3/00*     (2006.01)
    *G06T 7/00*     (2017.01)
    *G06T 7/73*     (2017.01)
    *G06T 7/246*     (2017.01)
    *G06V 10/10*     (2022.01)
    *G06V 10/26*     (2022.01)
    *G06V 10/40*     (2022.01)
    *G06V 10/75*     (2022.01)

(52) U.S. Cl.
CPC .................. *G06T 5/20* (2013.01); *G06T 7/00* (2013.01); *G06T 7/246* (2017.01); *G06T 7/73* (2017.01); *G06V 10/10* (2022.01); *G06V 10/26* (2022.01); *G06V 10/40* (2022.01); *G06V 10/757* (2022.01)

(56) References Cited

U.S. PATENT DOCUMENTS

| | | |
|---|---|---|
| 2012/0063638 A1 | 3/2012 | Lim et al. |
| 2014/0092132 A1 | 4/2014 | Issa et al. |
| 2014/0241576 A1 | 8/2014 | Yu et al. |
| 2017/0018086 A1 | 1/2017 | Zhang |

FOREIGN PATENT DOCUMENTS

| | | |
|---|---|---|
| CN | 105043392 A | 11/2015 |
| CN | 105261042 A | 1/2016 |
| CN | 105869166 A | 8/2016 |

OTHER PUBLICATIONS

Tencent Technology, IPRP, PCT/CN2018/093418, Jan. 7, 2020, 6 pgs.

Alexandre Eudes et al., "Visuo-Inertial Fusion for Homography-Based Filtering and Estimation", 2013 IEEE/RSJ International Conference on Intelligent Robots and Systems (IROS), Nov. 3-7, 2013, Tokyo, Japan, 7 pgs.

Jia Kaikai et al., "Novel Method on Features Tracking for Multi-image Matching", Journal of System Simulation, vol. 29, No. 5, May 2017, Information Engineering University, Zhengzhou, China, 6 pgs.

* cited by examiner

METHOD, DEVICE AND STORAGE MEDIUM FOR DETERMINING CAMERA POSTURE INFORMATION

CROSS-REFERENCE TO RELATED APPLICATIONS

This application is a continuation application of U.S. patent application Ser. No. 16/386,143, filed on Apr. 16, 2019, entitled "METHOD, DEVICE AND STORAGE MEDIUM FOR DETERMINING CAMERA POSTURE INFORMATION", which is a continuation application of PCT/CN2018/093418, entitled "METHOD, APPARATUS AND DEVICE FOR DETERMINING CAMERA POSTURE INFORMATION, AND STORAGE MEDIUM" filed on Jun. 28, 2018, which claims priority to Chinese Patent Application No. 201710552105.1, entitled "METHOD FOR DETERMINING CAMERA POSE INFORMATION AND RELATED APPARATUS" filed with Chinese National Intellectual Property Administration on Jul. 7, 2017, all of which are incorporated by reference in their entirety.

FIELD OF THE TECHNOLOGY

This application relates to the field of computer technologies, and in particular, to a method, an apparatus, and a device for determining camera pose information, and a storage medium.

BACKGROUND OF THE DISCLOSURE

An augmented Reality (AR) technology is a technology for calculating positions and angles of camera images in real time and adding corresponding images, videos or 3D models. This technology is aimed to apply the virtual world on a screen to the real world and perform interactions.

Currently, in interactive scenarios such an AR type game promotion and an AR type educational application, a natural image may be used as a template (Marker) image used for matching and corresponding camera pose information may be obtained. The natural image is a normally shot image, and the Marker image may be a natural image or a regular image, that is, an image having very obvious geometry features. In a process of obtaining camera pose information according to the Marker image, the Marker image needs to be detected first, and after the Marker image is detected, camera positioning is performed depending on tracking for feature points of the Marker image, to obtain the camera pose information.

However, during tracking for the feature points of the Marker image in the current image, changes of the feature points are not considered. When the affine transformation is obvious, if feature points of one image layer in the Marker image is matched with feature points in the current image, the obtained camera pose information has relatively low precision; and if a plurality of image layers of the Marker image are obtained, and feature points of each image layer are matched with the feature points in the current image, excessive match overheads are needed, and it is adverse to the running efficiency.

SUMMARY

Embodiments of this application provide a method, an apparatus, and a device for determining camera pose information, and a storage medium.

According to a first aspect of this application, a method for determining camera pose information of a camera of a mobile terminal is provided, the method including:

obtaining a first image, a second image, and a template image, the first image being a previous frame of image of the second image, the first image and the second image being images including a respective instance of the template image captured by the mobile terminal using the camera at a corresponding spatial position, and the template image being a reference image used for matching;

determining a first homography between the template image and the second image;

determining a second homography between the first image and the second image; and performing complementary filtering processing on the first homography and the second homography, to obtain camera pose information of the camera, wherein the camera pose information of the camera represents a spatial position of the mobile terminal when the mobile terminal captures the second image using the camera.

According to another aspect of this application, a mobile terminal is provided with a camera, one or more processors, memory and a plurality of instructions stored in the memory that, when executed by the one or more processors, cause the mobile terminal to perform the aforementioned method for determining camera pose information of the camera.

According to yet another aspect of this application, a non-transitory computer readable storage medium stores a plurality of instructions in connection with a mobile terminal having a camera, one or more processors, memory and a plurality of instructions stored in the memory that, when executed by the one or more processors, cause the mobile terminal to perform the aforementioned method for determining camera pose information of the camera according to the foregoing aspects.

As can be seen from the foregoing technical solutions, the embodiments of this application have at least the following advantages:

Because a first homography is obtained in a feature point detection manner according to a template image and a second image, an output result has a slow speed and low precision, and because a second homography is obtained through estimation according to an optical flow tracking result of a first image and the second image and an optical flow tracking result of the template image and the first image, the optical flow speed is fast, the precision is higher, and the output result is more stable and smooth, but errors may be accumulated with the passage of time. In the method provided in the embodiments, complementary filtering processing is performed on the first homography and the second homography, so that characteristics of the two homographies can be complemented, to obtain more precise camera pose information.

DESCRIPTION OF EMBODIMENTS

The embodiments of this application provide a method for determining camera pose information and a related apparatus. A template image is divided into a plurality of equal grids, and one target feature point is extracted from one grid at most. Therefore, target feature points are relatively evenly distributed and have a relatively high matching degree and fusion degree, so that when the running efficiency is ensured, the target feature points may be used to obtain camera pose information having higher precision.

The terms "first", "second", "third", "fourth", and the like (if exists) in the specification and the claims of this application and the foregoing accompanying drawings are used for distinguishing similar objects, and do not need to be used for describing a particular sequence or order. It should be understood that data used in this way is interchangeable in a suitable case, so that the embodiments of this application described herein can be implemented in a sequence in addition to the sequence shown or described herein. In addition, the terms "include", "comprise", and any variants thereof are intended to cover a non-exclusive inclusion. For example, a process, method, system, product, or device that includes a series of steps or elements is not limited to the steps or units that are clearly listed, but may include other steps or units that are not clearly listed or that are inherent to the process, method, product, or device.

Figure 1:
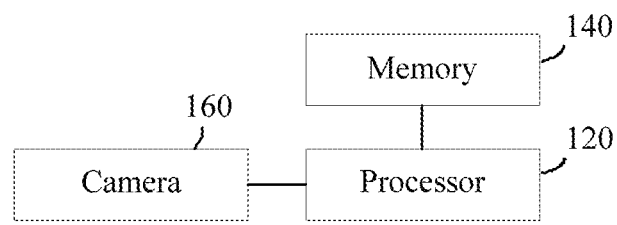
FIG. 1 is a structural block diagram of a terminal according to an embodiment of this application.

FIG. 1 shows a structural block diagram of a terminal according to an exemplary embodiment of this application. The terminal includes: a processor 120, a memory 140, and a camera 160.

The processor 120 includes one or more processing cores, for example, a 1-core processor or an 8-core processor. The processor 120 is configured to execute at least one of an instruction, a code, a code snippet, and a program stored in the memory 140.

The processor 120 is electrically connected to the memory 140. Optionally, the processor 120 is connected to the memory 140 by using a bus. The memory 140 stores one or more instructions, codes, code snippets, and/or programs. When executed by the processor 120, the instruction, the code, the code snippet, and/or the program are/is used to implement the method for determining camera pose information provided in the following embodiments.

The processor 120 is further electrically connected to the camera 160. Optionally, the processor 120 is connected to the camera 160 by using a bus. The camera 160 is a sensing device having an image collection capability. The camera 160 may also be referred to as another name such as a camera or a sensing device. The camera 160 has a capability of continuously collecting images or collecting images for multiple times. Optionally, the camera 160 is disposed inside the device or outside the device. In this embodiment of this application, the camera 160 may continuously collect multi-frame images, an $i^{th}$ frame of image in the multi-frame images is a first image, and an $(i+1)^{th}$ image in the multi-frame images is a second image.

Figure 2:
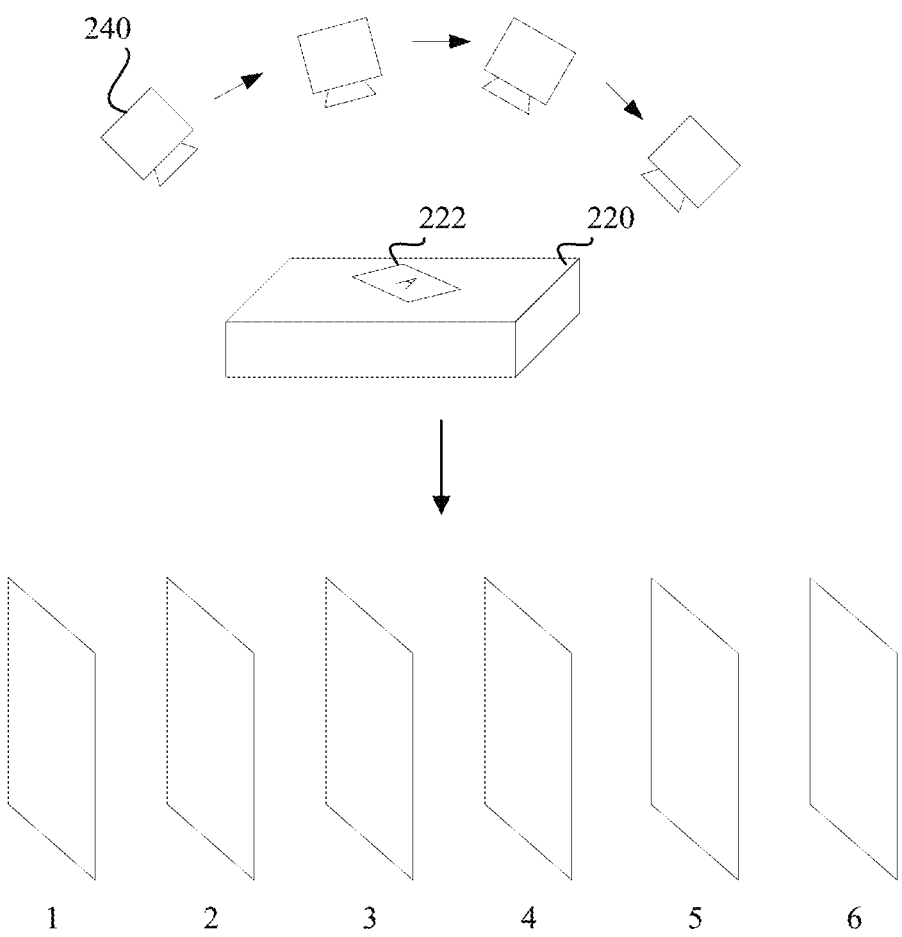
FIG. 2 is a schematic scenario diagram of an AR application scenario according to an exemplary embodiment of this application.

FIG. 2 is a schematic scenario diagram of an AR application scenario according to an exemplary embodiment of this application. There exists a desktop 220 in the real world, a picture 222 is on the desktop 220, and picture content of the picture 222 may be regarded as a Marker image. The Marker image is a reference image used for matching. A mobile terminal 240 having the camera performs continuous shooting by using the desktop 220 as a shot image, to obtain frames of images, such as images 1 to 6 shown in FIG. 2. The continuously shot frames of images are successively input to the processor for processing. In this embodiment of this application, the first image is used to refer to an $i^{th}$ frame of image collected by the camera, and the second image is used to refer to an $(i+1)^{th}$ frame of image collected by the camera. The mobile terminal measures a homography between the Marker image and the second image by using a detector, and measures a homography between the first image and the second image by using a tracker; and then, performs complementary filtering processing on the two homographies, to obtain camera pose information of the mobile terminal through calculation, the camera pose information being used to represent a spatial position of the mobile terminal when the mobile terminal shoots the second image in the real world.

The homography is also referred to as a homography matrix, and generally describes a transformation relationship of some points on a common plane between two images. The homography describes a mapping relationship between two planes, and if all feature points in a real environment fall on the same physical plane, movement estimation may be performed between two frames of images by using the homography. For image A and image B, when at least four pairs of matched feature points exist in image A and image B, the mobile terminal decomposes the homography by using a ransac (Random Sample Consensus) algorithm, to obtain a rotation and translation matrix R|T. R is a rotation matrix corresponding to the camera changing from a first pose for shooting image A to a second pose for shooting image B, and T is a displacement vector corresponding to the camera changing from the first pose for shooting image A to the second pose for shooting image B.

It should be understood that, in this application, for the characteristic of a low operational capability of the mobile device, in this solution, a complementary filtering algorithm is used to accurately fuse a natural image detection result and an image inter-frame tracking result stored by a user, to implement a stable and rapid method that is for determining camera pose information and that has strong robustness. The method may be applied to an AR scenario, for example, an interactive scenario such as an AR type game scenario, an AR type educational scenario, or an AR type conference scenario. The method may be applied to an application program of camera positioning and pose correction based on the Marker image. The template image in this application is the Marker image. The Marker image may also be referred to as an Anchor image.

Optionally, the Marker image includes a regular image or a natural image normally shot. The natural image refers to a normal shot image, and the regular image is an image having very obvious geometry features, such as a black rectangular box or a checkerboard. The Marker image may also appear in the real world, for example, the Marker image may also appear on a desktop or a book. That is, the Marker image may appear in a scenario that the mobile terminal needs to shoot, so as to establish a three-dimensional coordinate system of the real world based on the Marker image.

Figure 3:
FIG. 3 is a schematic diagram of a Marker image according to an embodiment of this application.
Figure 4:
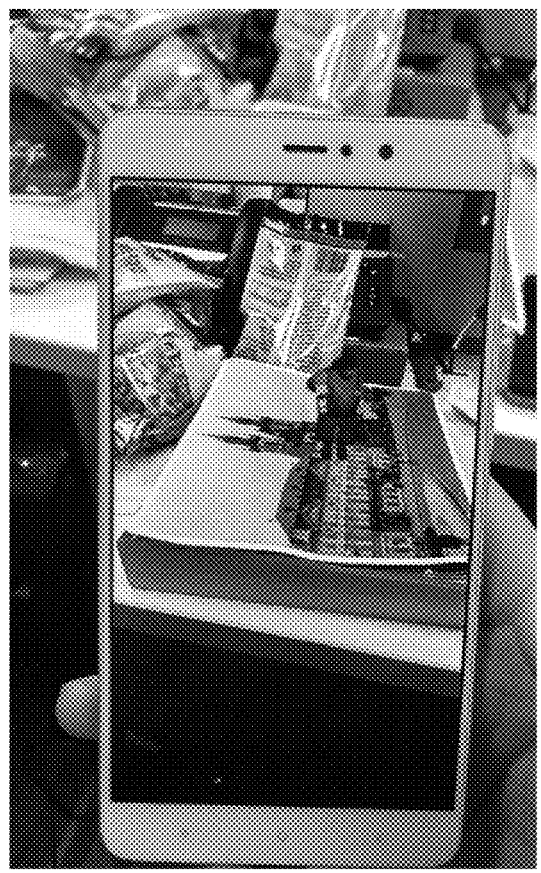
FIG. 4 is a schematic diagram of a Marker image detected in a current image according to an embodiment of this application.

The following describes a specific scenario. It is assumed that the user hopes to directly perform an interactive operation in a specified scenario (such as a given image). This may help guide user experience. Referring to FIG. 3, FIG. 3 is a schematic diagram of a Marker image according to an embodiment of this application. As shown in the figure, in an AR type game of a smartphone, a user may use a given natural image or an image shot by the phone at the scene, as a Marker image. Then, the smartphone detects a Marker part in the current image, and draws a virtual object in a Marker coordinate system. As shown in FIG. 4, FIG. 4 is a schematic diagram of detecting the Marker image in the current image according to an embodiment of this application, to complete interactions with users. The Marker part refers to an image region of the Marker image in the current image, and the Marker coordinate system refers to a coordinate system established in the current image for the real world based on the Marker part. For example, a cover image on a book in FIG. 4 is the same as the Marker image in FIG. 3. After the Marker coordinate system is established for the real world based on the cover image, a three-dimensional cartoon character is added and displayed on the book in FIG. 4 to interact with users.

Figure 5:
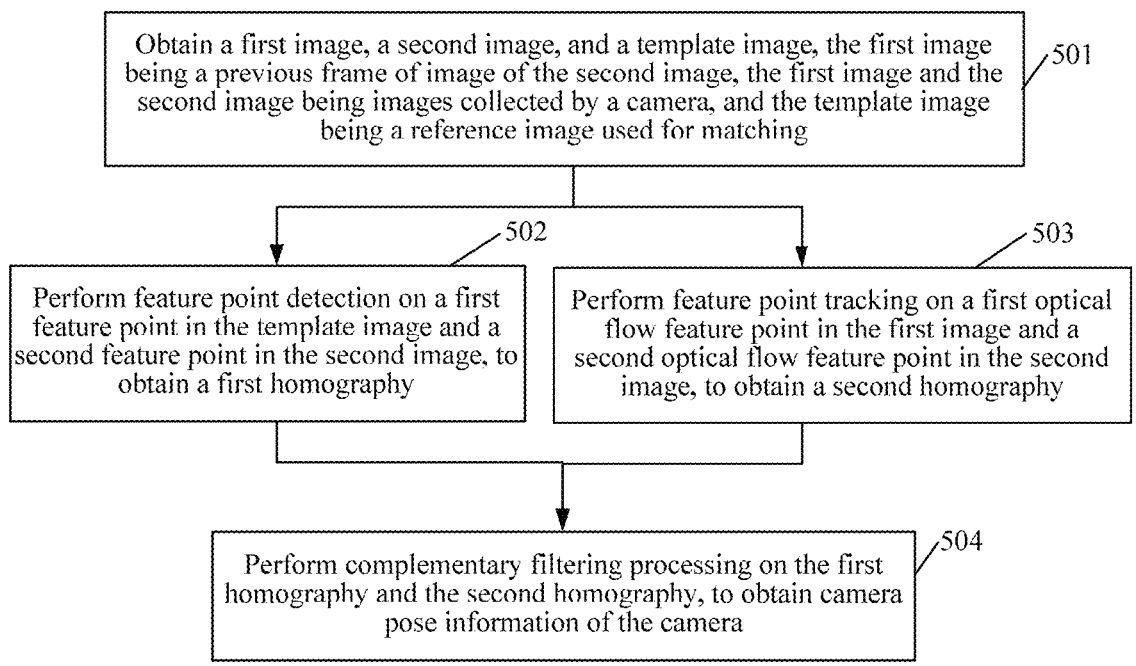
FIG. 5 is a schematic diagram of an embodiment of a method for determining camera pose information according to the embodiments of this application.

The following describes the method for determining camera pose information in this application from the perspective of the mobile terminal having the camera. Referring to FIG. 5, FIG. 5 is a flowchart of a method for determining camera pose information according to an exemplary embodiment of this application. The method includes:

Step 501. Obtain a first image, a second image, and a template image, the first image being a previous frame of image of the second image, the first image and the second image being images collected by a camera, and the template image being a reference image used for matching.

A terminal obtains the template image. Optionally, the terminal obtains a template image selected or uploaded by a user, or the terminal obtains a frame of image collected by a user by controlling a camera, as the template image.

The template image is a reference image used when matching is performed on multi-frame images collected by the camera in a movement process. Alternatively, the template image is a reference image used when matching is performed on a second image, and the second image is a frame of image of multi-frame images collected by the camera in a movement process.

Optionally, the terminal further obtains the multi-frame images collected by the camera in the movement process. The terminal uses an $i^{th}$ frame of image as a first image, and the first image is also referred to as a previous frame of image; and uses an $(i+1)^{th}$ frame of image as a second image, and the second image is also referred to as a current image.

Optionally, the obtaining process of the template image and the obtaining process of the first image/second image are independent of each other. The timing relationship of the two obtaining processes is not limited in this embodiment.

Step 502. Perform feature point detection on a first feature point in the template image and a second feature point in the second image, to obtain a first homography.

The terminal performs feature point detection on the first feature point in the template image and the second feature point in the second image, obtains at least four pairs of feature points of a Marker part in the template image and the second image through matching, and obtains a first homography through calculation according to the at least four pairs of feature points.

The first homography is used to represent a camera pose change from the template image to the second image.

Step 503. Perform feature point tracking on a first optical flow feature point in the first image and a second optical flow feature point in the second image, to obtain a second homography.

The terminal further performs optical flow tracking on the second image relative to the first image, to obtain an optical flow matching result of the second optical flow feature point in the second image relative to the first optical flow feature point in the first image, the optical flow matching result including at least four pairs of feature points, obtains a first target homography through calculation according to the at least four pairs of feature points, then obtains a buffered second target homography from the template image to the first image, and obtains a second homography according to the first target homography and the second target homography.

The optical flow is a method for describing pixels moving between images with the time. With the passage of time, the same pixel moves in the images, and we hope to track the movement process of the pixel. An optical flow for calculating the movement of some pixels is referred to as a sparse optical flow, and an optical flow for calculating all pixels is referred to as a dense optical flow. In this application, a Lucas-Kanade (LK) optical flow algorithm for calculating the sparse optical flow is used as an example for description.

The second homography is also used to represent a camera pose change from the template image to the second image. Although both the first homography and the second homography are used to represent the camera pose change from the template image to the second image, the first homography and the second homography are obtained through calculation according to different calculation manners.

Step 504. Perform complementary filtering processing on the first homography and the second homography, to obtain camera pose information of the camera.

The complementary filtering processing refers to a processing manner for performing filtering fusion on the first homography and the second homography. Optionally, the complementary filtering processing is implemented by using a Kalman filter or a complementary filter.

In conclusion, because a first homography is obtained in a feature point detection manner according to a template image and a second image, an output result has a slow speed and low precision, and because a second homography is obtained through estimation according to an optical flow tracking result of a first image and the second image and an optical flow tracking result of the template image and the first image, the optical flow speed is fast, the precision is higher, and the output result is more stable and smooth, but errors may be accumulated with the passage of time. In the method provided in the embodiments, complementary filtering processing is performed on the first homography and the second homography, so that characteristics of the two homographies can be complemented, to obtain more precise camera pose information.

In an optional embodiment based on FIG. 5, the performing complementary filtering processing on the first homography and the second homography, to obtain camera pose information of the camera includes:

determining a first rotation and translation matrix according to the first homography, and determining a second rotation and translation matrix according to the second homography, the first homography and the second homography being two-dimensional information, and the first rotation and translation matrix and the second rotation and translation matrix being three-dimensional information; and performing complementary filtering processing on the first rotation and translation matrix and the second rotation and translation matrix, to obtain the camera pose information.

In an optional embodiment based on FIG. 5, the performing complementary filtering processing on the first rotation and translation matrix and the second rotation and translation matrix, to obtain the camera pose information includes:

inputting the first rotation and translation matrix to a low-pass filter, to obtain a first filtering result;

inputting the second rotation and translation matrix to a high-pass filter, to obtain a second filtering result; and determining the camera pose information according to the first filtering result and the second filtering result.

In an optional embodiment based on FIG. 5, the determining a first rotation and translation matrix according to the first homography, and determining a second rotation and translation matrix according to the second homography includes:

calculating the first rotation and translation matrix according to the first homography, a perspective projection matrix of the second image, and a perspective projection matrix of the template image; and calculating the second rotation and translation matrix according to the second homography, the perspective projection matrix of the second image, and the perspective projection matrix of the template image.

In an optional embodiment based on FIG. 5, the template image corresponds to a plurality of grids arranged in arrays; and the performing feature point detection on a first feature point in the template image and a second feature point in the second image, to obtain a first homography includes:

matching the first feature point in the template image with the second feature point in the second image, and determining a set of feature point pairs in each target grid of the plurality of grids, the feature point pair including: a first feature point located in the target grid, and a feature point that is in the second feature point and that has the largest matching degree with the first feature point; and calculating the first homography between the template image and the second image according to the feature point pairs in the target grid.

In an optional embodiment based on FIG. 5, the method further includes:

extracting the first feature point from each image layer of the template image, and determining the first feature point in an original image layer, the original image layer being an image layer of the template image, and the original image layer including the plurality of grids.

In an optional embodiment based on FIG. 5, the extracting the first feature point from each image layer of the template image, and determining the first feature point in an original image layer includes:

extracting the first feature point from a first image layer of the template image;

extracting the first feature point from a second image layer of the template image, the first image layer and the second image layer having different sizes; and performing scaling processing on the first feature point in the first image layer and the first feature point in the second image layer, and performing projection to the original image layer.

In an optional embodiment based on FIG. 5, before the matching the first feature point in the template image with the second feature point in the second image, the method further includes:

extracting the second feature point from the second image; and the matching the first feature point in the template image with the second feature point in the second image, and determining a set of feature point pairs in each target grid of the plurality of grids includes:

matching the first feature point in each of the target grid of the original image layer with the second feature point, and obtaining at least one pair of mutually matched to-be-selected feature point pairs, each set of the to-be-selected feature point pairs corresponding to a matching score; and selecting a feature point pair having the highest matching score from the at least one pair of to-be-selected feature point pairs, as a feature point pair determined in the target grid.

In an optional embodiment based on FIG. 5, the performing feature point tracking on a first optical flow feature point in the first image and a second optical flow feature point in the second image, to obtain a second homography includes:

determining a first target homography according to a first optical flow feature point in the first image and a second optical flow feature point in the second image; and determining the second homography according to the first target homography and the second target homography.

In an optional embodiment based on FIG. 5, the determining a first target homography according to a first optical flow feature point in the first image and a second optical flow feature point in the second image includes:

obtaining the first optical flow feature point in a preset region of the first image, the preset region being a region corresponding to the template image;

obtaining the second optical flow feature point according to the first optical flow feature point; and calculating the first target homography from the first image to the second image according to the first optical flow feature point and the second optical flow feature point.

In an optional embodiment based on FIG. 5, the determining a second homography according to the first target homography and the second target homography includes:

obtaining the second target homography from the template image to the first image; and calculating the second homography from the second image to the template image according to the first target homography and the second target homography.

In an optional embodiment based on FIG. 5, the method further includes:

obtaining q optical flow feature points as the second optical flow feature points if the quantity of the second optical flow feature points is less than a preset threshold, so that the quantity of the second optical flow feature points reaches the preset threshold, q being a positive integer.

Figure 6:
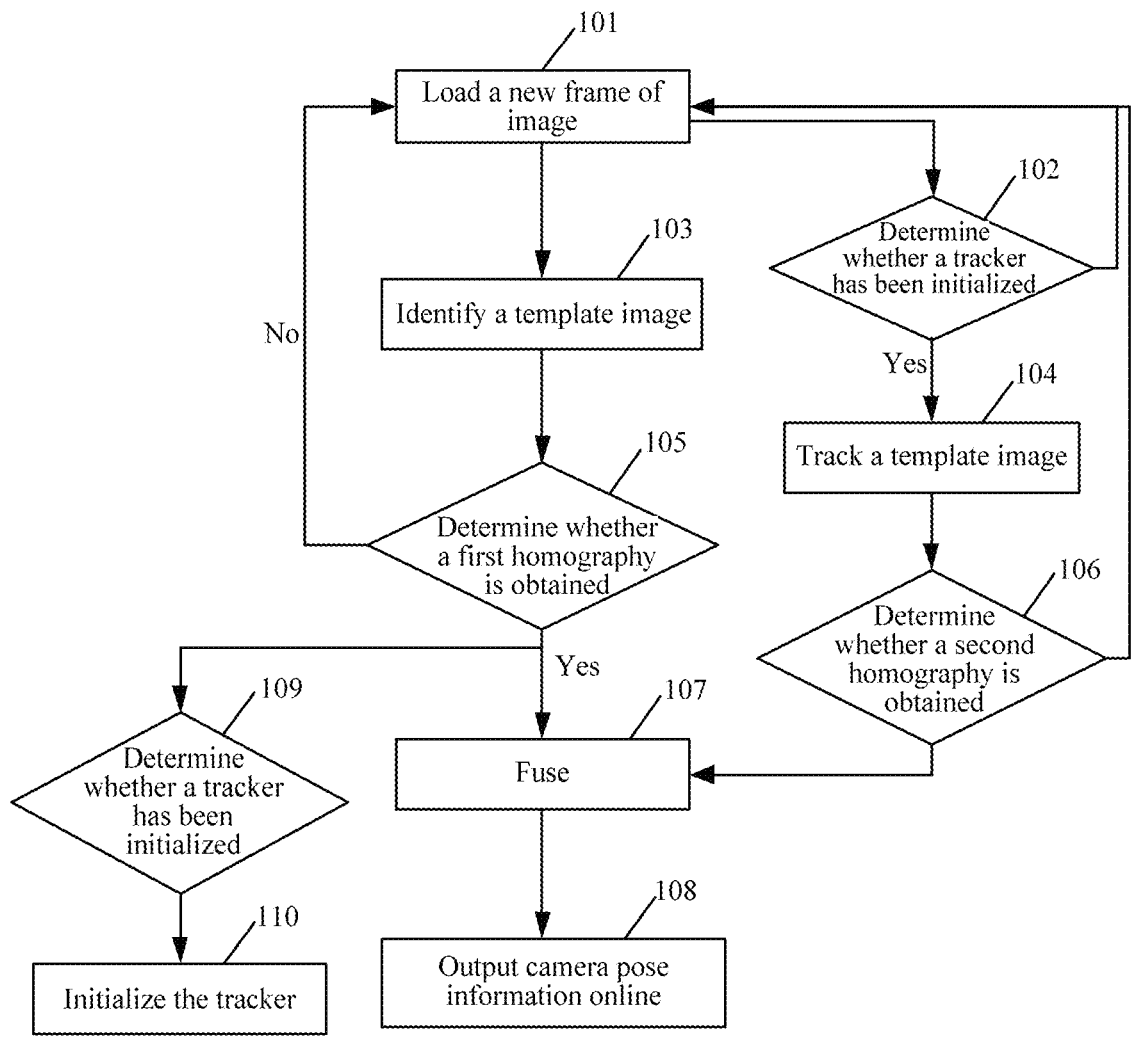
FIG. 6 is a schematic flowchart of a method for determining camera pose information according to an embodiment of this application.

For ease of understanding, referring to FIG. 6, FIG. 6 is a schematic flowchart of a method for determining camera pose information according to an embodiment of this application. As shown in the figure, a camera continuously collects frames of images in the real world, first loads a new frame of image in a module 101 as a current image, then detects a first homography from a template image to the current image (that is, a second image) by using a detector of a module 103, further determines, in a module 105, whether the first homography is obtained, and reaches a module 107 if the first homography is obtained. On the other hand, the camera determines, in a module 102, whether a tracker has been initialized, enters the tracker of a module 104 if the tracker has been initialized, the tracker being used to perform optical flow tracking on the second image relative to the first image; and skips to a module 101 if the tracker has not been initialized.

The tracker in the 104 module tracks the template image, and updates a second homography. Therefore, complementary filtering processing may be performed on the first homography and the second homography in the module 107 for fusion, and the camera pose information obtained after the fusion is output to a module 108. If the module 105 determines that the detection has a result and a module 109 determines that the tracker has not been initialized, the tracker is initialized, and the tracker starts to work from a next frame.

It may be understood that, the detector and the tracker belong to an apparatus for determining camera pose information.

Figure 7:
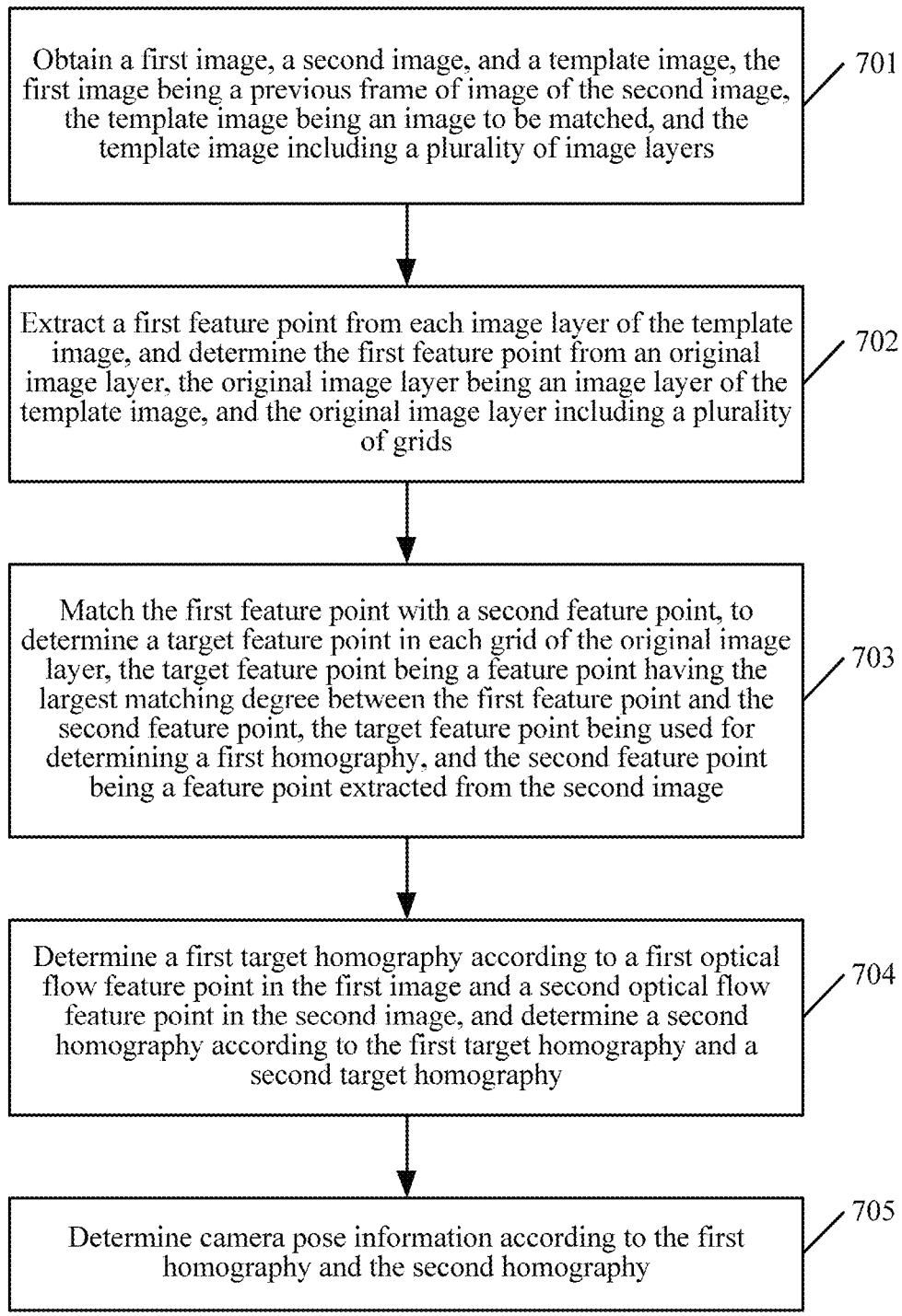
FIG. 7 is a schematic diagram of an embodiment of the method for determining camera pose information according to the embodiments of this application.

From the perspective of the apparatus for determining camera pose information, the following describes the method for determining camera pose information in this application. Referring to FIG. 7, FIG. 7 shows a flowchart of the method for determining camera pose information according to an exemplary embodiment of this application. The method includes:

701. Obtain a first image, a second image, and a template image, the first image being a previous frame of image of the second image, the template image being an image used for matching, and the template image including a plurality of image layers.

In this embodiment, the apparatus for determining camera pose information obtains the first image, the second image, and the template image. The first image is a previous frame of image of the second image, and the second image may be understood as a currently shot image or an image being processed currently. The template image is a to-be-matched image, or may be referred to as a Marker image or an Anchor image. Optionally, the template image includes a plurality of image layers.

The apparatus for determining camera pose information may be any terminal device such as a mobile phone, a tablet computer, a personal digital assistant (PDA), a point of sales (POS), or an in-vehicle computer.

702. Extract a first feature point from each image layer of the template image, and determine the first feature point from an original image layer, the original image layer being an image layer of the template image, and the original image layer including a plurality of grids.

In this embodiment, the template image includes a plurality of image layers. Generally, the sizes of the image layers are inconsistent, and a template image in an original size is referred to as an original image layer. Optionally, in a preprocessing phase, the terminal downsamples the template image in the original size to generate a pyramid image. The pyramid image includes an image obtained after the template image in the original size is scaled according to a preset proportion. An example in which the pyramid image includes four layers of images is used. After the template image is scaled according to scaling proportions 1.0, 0.8, 0.6, and 0.4, four different scales of image layers of the template image are obtained. The first feature point is extracted for each image layer. Therefore, a plurality of layers of feature descriptors (that is, the first feature points) of the template image in a plurality of scales is obtained, and at the same time, the first feature points are scaled. Positions of all first feature points are scaled to corresponding positions of the original image layers, and a mask in the size of the original image layer (that is, the size of the mask is consistent with the size of the original image layer) is manufactured. The mask is evenly divided into a plurality of small grids for use. In other words, the terminal extracts the feature points for each layer of the pyramid image and calculates an ORB feature descriptor. For feature points not extracted from the pyramid image in an original scale (1.0), after the pyramid image is scaled up to the original scale according to the scaling proportion, two-dimensional coordinates of each feature point on the pyramid image in the original scale (that is, the original image layer) are recorded. The feature points on the pyramid image and the two-dimensional coordinates may be referred to as first feature points. In an example, each layer of pyramid image has 500 first feature points at most.

It should be noted that, the first feature points may be scale-invariant feature transform (SIFT), or speeded-up robust features (SURF), or oriented fast and rotated brief (ORB) feature points, or histogram of oriented gradient (HOG) features, or local binary patterns (LBP). To ensure the real-time performance, the ORB feature points are used as the first feature points in this solution. However, this does not constitute a limitation to this solution. An ORB feature point includes two parts: a FAST key-point and a binary robust independent elementary feature descriptor.

The FAST key-point refers to a position in which the ORB feature point is in an image. The FAST key-point mainly detects a position in which the local pixel gray-scale changes obviously, and is famous for the high speed. The idea of the FAST key-point is: If a pixel and a neighborhood pixel differ greatly (overly bright or dark), the pixel may be a key-point.

The BRIEF descriptor is a vector in binary representation, and the vector describes information about pixels around the key-point in a manual design manner. A description vector of the BRIEF descriptor is formed by a plurality of 0s and 1s, and 0 and 1 herein encode a size relationship between two pixels around the FAST key-point.

The ORB feature point is a descriptor using an acceleration algorithm, and is added with rotation invariance, so that the speed is very fast. Therefore, the ORB feature point is suitable for being implemented on a mobile device.

703. Match the first feature point with a second feature point, to determine a target feature point in each grid of the original image layer, the target feature point being a feature point having the largest matching degree between the first feature point and the second feature point, the target feature point being used to determine a first homography, and the second feature point being a feature point extracted from the second image.

In this embodiment, the first feature point has no scale-invariance, but the template image in our application has obvious scale variations, and the user may shoot the template image in different scales. Therefore, the scale problem needs to be resolved. Therefore, a pyramid image needs to be generated for the template image, and a first feature point needs to be extracted from each layer image layer of the template image, and then matched with a second feature point in the second image.

The apparatus for determining camera pose information detects whether the currently shot second image has a template image. The principle is to match a second feature point extracted on the second image with a first feature point on the original image layer. For the first feature point in each target grid of the original image layer, if the second image has a plurality of second feature points that belongs to the target grid and that matches the first feature point, a to-be-selected feature point is selected from each target grid at most as a target feature point, and then the target feature point is used to calculate the first homography.

704. Determine a first target homography according to a first optical flow feature point in the first image and a second optical flow feature point in the second image, and determine a second homography according to the first target homography and a second target homography.

In this embodiment, step 702 to step 703 complete the detection work of the template image, and the apparatus for determining camera pose information in step 204 needs to use an optical flow tracking method to track the image. Specifically, during tracking of the image, an optical flow Lucas-Kanade algorithm is mainly used, optical flow is performed from a new image by using a first optical flow feature point extracted from a previous frame of image (that is, the first image), to find matching points between two frames, to calculate the first target homography from the first image to the second image, and obtain the second target homography that is from the template image to the first image and that is buffered in a historical optical flow process, to further obtain the second homography from the template image to the second image.

705. Determine camera pose information according to the first homography and the second homography.

In this embodiment, the apparatus for determining camera pose information may obtain the camera pose information through calculation according to the first homography and the second homography. Optionally, the apparatus for determining camera pose information performs complementary filtering processing on the first homography and the second homography, to obtain the camera pose information of the camera.

The complementary filtering processing refers to a processing manner for performing filtering fusion on the first homography and the second homography. Optionally, the complementary filtering processing is implemented by using a Kalman filter or a complementary filter.

In this embodiment of this application, a method for determining camera pose information is provided. The apparatus for determining camera pose information first obtains a first image, a second image, and a template image, then extracts a first feature point from each image layer of the template image, and determines the first feature point in an original image layer, the original image layer being an image layer of the template image, and the original image layer including a plurality of grids. The apparatus for determining camera pose information then matches the first feature point with a second feature point, to determine a target feature point in each grid of the original image layer, the target feature point being a feature point having the largest matching degree between the first feature point and the second feature point, the target feature point being used to determine a first homography, and the second feature point being a feature point extracted from the second image. Next, the apparatus for determining camera pose information may determine a first target homography according to a first optical flow feature point in the first image and a second optical flow feature point in the second image, determines a second homography according to the first target homography and a second target homography, and finally determines camera pose information according to the first homography and the second homography. By using the foregoing manner, the template image is divided into a plurality of equal grids, and one grid only has one target feature point. Therefore, target feature points are relatively evenly distributed and have a relatively high matching degree and fusion degree, so that when the running efficiency is ensured, the target feature point may be used to obtain the camera pose information having higher precision.

Optionally, on the basis of the embodiment corresponding to the foregoing FIG. 7, in a first optional embodiment of the method for determining camera pose information according to the embodiments of this application, the extracting a first feature point from each image layer of the template image, and determining the first feature point in an original image layer may include:

extracting the first feature point from a first image layer of the template image;

extracting the first feature point from a second image layer of the template image, the first image layer and the second image layer having different sizes; and performing scaling processing on the first feature point in the first image layer and the first feature point in the second image layer, and performing projection to the original image layer.

In this embodiment, the manner for determining the first feature point in the original image layer is described. First, a plurality of layers of images is extracted from the template image (or a plurality of layers of images is obtained by scaling down according to different scaling proportions), and sizes of the images are in a pyramid shape, that is, the sizes of the images are sorted in an ascending order. Assuming that the first image layer is on the second image layer, it may be regarded that the size of the first image layer is slightly less than the size of the second image layer. Then, the apparatus for determining camera pose information extracts the first feature point from the first image layer and the second image layer, and performs scaling on all first feature points, to perform projection to the original image layer.

It may be understood that, the size of the original image layer may be designed according to actual cases, and is not limited herein. In an exemplary example, after the original image layer of the template image is scaled according to scaling proportions 1.0, 0.8, 0.6, and 0.4, to obtain a first image layer, second image layer, a third image layer, and a fourth image layer of the template image.

Second, in this embodiment of this application, the apparatus for determining camera pose information first extracts the first feature point from the first image layer of the template image, and extracts the first feature point from the second image layer of the template image, the first image layer and the second image layer having different sizes, and then performs scaling processing on the first feature point in the first image layer and the first feature point in the second image layer, and performs projection to the original image layer. By using the foregoing manner, all first feature points extracted from the image layers may be fused on the original image layer corresponding to the template image, to obtain first feature points as many as possible, to facilitate further filtering of the first feature points, thereby improving the filtering accuracy. At the same time, the matching performance is enhanced, and it is ensured that an object can also be detected in a large scale variation.

Optionally, on the basis of the first embodiment corresponding to FIG. 7, in a second optional embodiment of the method for determining camera pose information according to the embodiments of this application, the template image corresponds to a plurality of grids arranged in arrays; and the performing feature point detection on a first feature point in the template image and a second feature point in the second image, to obtain a first homography includes:

matching the first feature point in the template image with the second feature point in the second image, and determining a set of feature point pairs in each target grid of the plurality of grids, the feature point pair including: a first feature point located in the target grid, and a feature point that is in the second feature point and that has the largest matching degree with the first feature point; and calculating the first homography between the template image and the second image according to the feature point pairs in the target grid.

The target grid is a part of grids of the plurality of grids of the template image. That is, the first feature point in the target grid has a matched target feature point in the second image, and each target grid only corresponds to a set of matched feature point pairs. Because when homography calculation is performed on two images, only at least four pairs of feature point pairs may be needed to calculate the homography, the quantity of feature point pairs is less required but the feature point pair requires higher quality. Feature point pairs in the same grid have a relatively high similarity degree, and the terminal may select feature point pairs belonging to different target grids as possible as it can for subsequent calculation.

Figure 8:
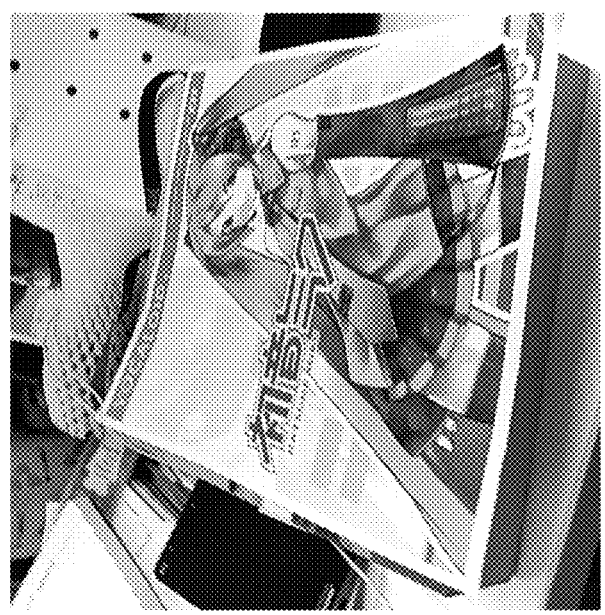
FIG. 8 is a schematic diagram of a template image according to an embodiment of this application.

In this embodiment, it is assumed that the template image is inclined severely, as shown in FIG. 8. A cover image of a book in FIG. 8 is a schematic diagram of a template image according to an embodiment of this application. In this case, the left half part has a small scale, and the right half part has a large scale. A pyramid space of a single layer cannot accurately describe this case. Therefore, such type of features may be described by using the following manner.

Figure 9:
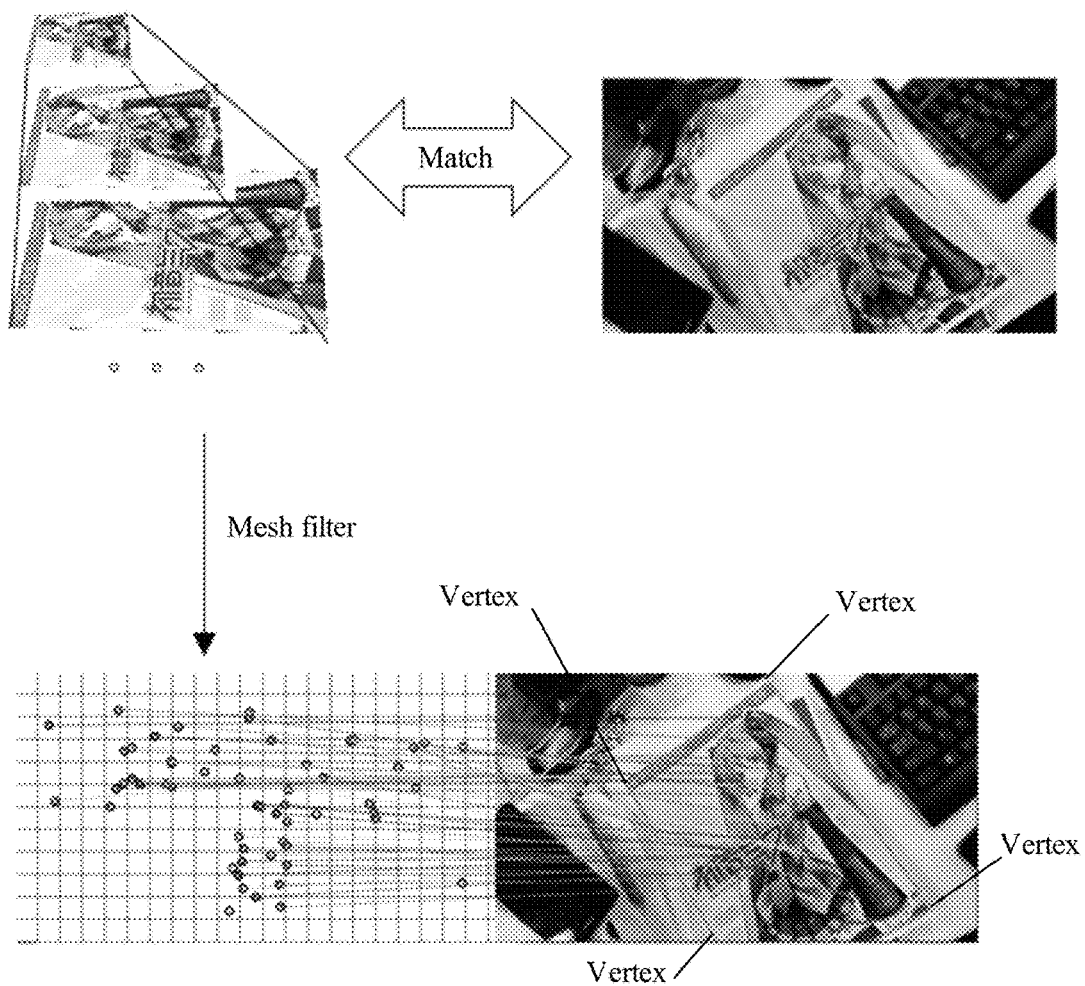
FIG. 9 is a schematic diagram of an embodiment of determining a target feature point on an original image layer according to an embodiment of this application.

Specifically, referring to FIG. 9, FIG. 9 is a schematic diagram of an embodiment of determining a target feature point on an original image layer according to an embodiment of this application. An original template image is downsampled to generate a pyramid image, and the first feature point is extracted for each layer. Therefore, a plurality of layers of first feature points of the template image in a plurality of scales is obtained. At the same time, the feature points are scaled. Positions of all feature points are scaled and unified to the size of the original image layer, and a mask in the size of the original image layer is manufactured, and divided into a plurality of small grids for use.

For each newly read image, the second feature point is only extracted once, and then matched with the first feature point on the original image layer, that is, feature matches in a plurality of scales may be obtained. Each of the foregoing matches (or feature point pairs) includes points on a current image and points on a template image. Because each of the points on the template image has a plurality of scales and is scaled to the size of the original image layer, a plurality of matched feature points is accumulated in the same grid region. Only a point having the highest matching score is selected in each grid as a representative. Through filtering by a mesh filter, a match from the template image to the second image after a plurality of sets of grids is filtered may be obtained. When there exist at least four sets of feature point pairs from the template image to the second image after grids are filtered, the first homography from the template image to the second image is obtained through calculation according to the at least four sets of feature point pairs.

In the grids of the template image, more than one layer of feature points may be fused. Our grid filtering method is equivalent to smoothing two layers of neighboring feature points, and two layers of matching information are used according to a proportion. Therefore, the quantity of needed pyramid layers may be reduced greatly. Using FIG. 9 as an example, a corresponding scale is automatically selected for grid filtering, a low scale is selected on the left half part, and a high scale is selected on the right half part, so that the matching may be better.

Second, in this embodiment of this application, the apparatus for determining camera pose information first extracts the second feature point from the second image, then matches the first feature point with the second feature point in each grid of the original image layer, and obtains at least one to-be-selected feature point, each to-be-selected feature point corresponding to a matching score, and finally, selects a feature point having the highest matching score from the at least one to-be-selected feature point in each grid of the original image layer, as the target feature point. By using the foregoing manner, the largest quantity of matched feature points is limited by using grids, to ensure the stability of the calculation of the first homography, and only the second feature point is extracted for the second image once during running. The increased feature matching consumes less time, and does not affect the running speed, thereby increasing the matching efficiency.

Optionally, on the basis of the embodiment corresponding to FIG. 7, in a third optional embodiment of the method for determining camera pose information according to the embodiments of this application, the determining a first target homography according to a first optical flow feature point in the first image and a second optical flow feature point in the second image may include:

obtaining the first optical flow feature point in a preset region of the first image, the preset region being a region corresponding to the template image;

obtaining the second optical flow feature point according to the first optical flow feature point; and calculating the first target homography from the first image to the second image according to the first optical flow feature point and the second optical flow feature point.

In this embodiment, in the process for the apparatus for determining camera pose information to determine the first target homography, the first optical flow feature point needs to be obtained in the preset region of the first image. The preset region may include four vertexes, and the four vertexes initialize an image region. The image region is a region of template image in the first image, and some Shi-Tomasi key-points are extracted on the region as the first optical flow feature points.

With the moving of the camera, the previous optical flow feature points may not be very good. Especially with the rotation and the perspective projection, the previous optical flow points may be no longer observed on the current image. Therefore, the optical flow feature points tracked by the optical flow need to be updated every several frames. The four vertexes (may refer to the four vertexes of the book in the figure at the lower right side of FIG. 9) of the preset region are calculated by using a previous frame. Scaling down is performed by one circle to find a mask, and a second optical flow feature point is determined in the mask by using an optical flow algorithm. It may be understood that, the entire process is running in a background thread, and the speed of a main thread is not affected. By using the foregoing method, the tracked optical flow feature points are automatically updated, thereby ensuring the stability of the optical flow algorithm. The first target homography from the first image to the second image is calculated according to the first optical flow feature point and the second optical flow feature point, and the first target homography is used as the recursive basis from the first image to the template image.

The quantity of pixels of the mask is less than the quantity of pixels of the preset region, because we need to obtain the optical flow feature points on the template image. Feature points at edges are easily detected incorrectly. Therefore, the quantity of pixels of the mask obtained by performing scaling down by one circle is also reduced.

Second, in this embodiment of this application, the apparatus for determining camera pose information obtains the first optical flow feature point in the preset region of the first image, and obtains the second optical flow feature point according to the optical flow algorithm and the mask of the first optical flow feature point in the second image. Finally, the first target homography from the first image to the second image is calculated according to the first optical flow feature point and the second optical flow feature point. By using the foregoing manner, the mask is obtained by performing scaling down by one circle by using the vertexes of the preset region that are calculated by using the previous frame of image, so that cases in which feature points at edges are detected may be decreased, thereby reducing the error rate of the detection.

Optionally, on the basis of the third embodiment corresponding to FIG. 7, in a fourth optional embodiment of the method for determining camera pose information according to the embodiments of this application, the determining the second homography according to the first target homography and the second target homography may include:

obtaining the second target homography from the template image to the first image; and calculating the second homography from the second image to the template image according to the first target homography and the second target homography.

In this embodiment, in the process for the apparatus for determining camera pose information to determine the second homography or before the apparatus determines the second homography, a third optical flow feature point needs to be obtained in the template image, then, a matching point of the template image and the first image is found according to the third optical flow feature point and the first optical flow feature point, to calculate the second target homography, and the second target homography is multiplied by the first target homography to obtain the second homography from the template image to the second image.

The current image is the second image, and the previous frame of image is the first image.

Third, in this embodiment of this application, the manner for the apparatus for determining camera pose information to determine the second homography is described. That is, first, the second target homography from the template image to the first image is obtained, and then, the second homography from the second image to the template image is calculated according to the first target homography and the second target homography. By using the foregoing manner, the optical flow feature points may be used to obtain the second homography, thereby improving the feasibility and practicability of the solution.

Optionally, on the basis of the third or four embodiment corresponding to the foregoing FIG. 7, in a fifth optional embodiment of the method for determining camera pose information according to the embodiments of this application, the method may further include:

obtaining q optical flow feature points as the second optical flow feature points if the quantity of the second optical flow feature points is less than a preset threshold, so that the quantity of the second optical flow feature points reaches the preset threshold, q being a positive integer.

In this embodiment, if the quantity of second optical flow feature points obtained from the mask in the second image is less than the preset threshold, it indicates that the quantity of remaining second optical flow feature points is excessively small, and insufficient to represent the features of the mask. Therefore, other q optical flow feature points need to be extracted from the mask as the second optical flow feature points, so that the quantity of the second optical flow feature points reaches the preset threshold.

It may be understood that, the preset threshold may be 50, 100, or another value. This is not limited herein.

Further, in this embodiment of this application, if the quantity of the second optical flow feature points is less than the preset threshold, the apparatus for determining camera pose information obtains q optical flow feature points from the mask as the second optical flow feature points, so that the quantity of the second optical flow feature point reaches the preset threshold. By using the foregoing manner, when the quantity of the second optical flow feature points is insufficient, new optical flow feature points may be re-extracted to compensate, that is, the tracked feature points are automatically updated, thereby improving the stability of the optical flow algorithm.

Optionally, on the basis of the embodiments corresponding to FIG. 7, in a sixth optional embodiment of the method for determining camera pose information according to the embodiments of this application, the determining camera pose information according to the first homography and the second homography may include:

determining a first rotation and translation matrix according to the first homography, and determining a second rotation and translation matrix according to the second homography, the first homography and the second homography being two-dimensional information, and the first rotation and translation matrix and the second rotation and translation matrix being three-dimensional information; and performing complementary filtering processing on the first rotation and translation matrix and the second rotation and translation matrix, to obtain the camera pose information.

In this embodiment, when the apparatus for determining camera pose information determines the camera pose information, two steps are needed. The first step is mainly determining two rotation and translation matrixes. The second step is mainly performing complementary filtering processing on the two rotation and translation matrixes, to finally obtain the camera pose information.

The process for transforming a homography into a rotation and translation matrix may be understood as a process for transforming two-dimensional coordinates to three-dimensional coordinates. For the specific implementation, reference may be made to a seventh embodiment corresponding to FIG. 7. After the three-dimensional coordinates are obtained, the position of the camera in the real world when the camera collects the template image may be determined.

It may be understood that, for the apparatus for determining camera pose information, the time-consuming part is mainly on the detection. For a frame of image, it costs less than 10 ms at most for a tracker to track the frame of image, and it costs nearly 30 ms for a detector to detect the frame of image. Therefore, another alternative solution is fusing the first rotation and translation matrix and the second rotation and translation matrix instead of detection on each frame. Instead, detection and fusion of each frame are put in a back-end thread. The modified increment obtained through the fusion is used to modify the subsequent camera pose, so that only tracking time is needed in the main thread. The detection and fusion may not block the main thread, and the calculation speed can be increased.

Second, in this embodiment of this application, the process of determining the camera pose information is divided into two parts. One part is determining the first rotation and translation matrix according to the first homography, and determining the second rotation and translation matrix according to the second homography. The other part is performing complementary filtering processing on the first rotation and translation matrix and the second rotation and translation matrix, to obtain the camera pose information of the camera. By using the foregoing manner, a two-dimensional homography may be decomposed into a three-dimensional rotation and translation matrix. Because all first feature points on the template image are fused on the original image layer, the solution of only one set of rotation and translation matrixes may be obtained, thereby improving the operability of the solution. The complementary filtering manner can be used to obtain smoother camera pose information.

Optionally, on the basis of the sixth embodiment corresponding to FIG. 7, in the seventh optional embodiment of the method for determining camera pose information according to the embodiments of this application, the determining a first rotation and translation matrix according to the first homography, and determining a second rotation and translation matrix according to the second homography may include:

calculating the first rotation and translation matrix according to the first homography, a perspective projection matrix of the second image, and a perspective projection matrix of the template image. Optionally, the rotation part in the first rotation and translation matrix is used to represent a spatial rotation change of the camera changing from a first pose for collecting the template image to a second pose for collecting the second image, and the translation part in the first rotation and translation matrix is used to represent a spatial displacement change of the camera changing from the first pose for collecting the template image to the second pose for collecting the second image.

calculating the second rotation and translation matrix according to the second homography, the perspective projection matrix of the second image, and the perspective projection matrix of the template image. Optionally, the rotation part in the second rotation and translation matrix is also used to represent a spatial rotation change of the camera changing from a first pose for collecting the template image to a second pose for collecting the second image, and the translation part in the second rotation and translation matrix is also used to represent a spatial displacement change of the camera changing from the first pose for collecting the template image to the second pose for collecting the second image.

In this embodiment, when we have the first homography, the first rotation and translation matrix may be obtained through decomposition in combination with camera parameters. Likewise, when we have the second homography, the second rotation and translation matrix may be obtained through decomposition in combination with the camera parameters. The following uses an example in which the first rotation and translation matrix is obtained through decomposition for description. The manner for obtaining the second rotation and translation matrix through decomposition is similar to the manner for obtaining the first rotation and translation matrix through decomposition, and is not described herein again.

By using the feature that all points on the template image are on the same plane, the following method may be used to obtain a set of determined solutions through decomposition. According to the definition of the homography and the definition of rotation and translation matrixes between cameras, there may be the following formulas:

$xc = H * xm$; and $xc = s * P * (R|T) * P^{-1} * xm$.

xc represents the homogeneous representation of two-dimensional coordinates on the second image, xm is the homogeneous representation of two-dimensional coordinates on the template image, H represents the first homography, (R|T) represents the first rotation and translation matrix, P represents the perspective projection matrix, and s represents a scale factor. Because z=1 when three-dimensional points are obtained through back projection of xm, and the depth is lost, the scale factor s needs to be used to compensate.

For example, if homogeneous coordinates of the 2D point $[x,y]^T$ are $[x,y,1]^T$, homogeneous coordinates of the 3D point $[x,y,z]^T$ are $[x,y,z,1]^T$. Therefore, it may be deduced as follows:

$$\begin{bmatrix} h_{00} & h_{01} & h_{02} \\ h_{10} & h_{11} & h_{12} \\ h_{20} & h_{21} & h_{22} \end{bmatrix} = sP_c(R|T)P_m^{-1} * xm =$$

$$s\begin{bmatrix} f_x & 0 & c_x & 0 \\ 0 & f_y & c_y & 0 \\ 0 & 0 & 1 & 0 \end{bmatrix} \begin{bmatrix} R_{00} & R_{01} & R_{02} & T_0 \\ R_{10} & R_{11} & R_{12} & T_1 \\ R_{20} & R_{21} & R_{22} & T_2 \\ 0 & 0 & 0 & 1 \end{bmatrix} \begin{bmatrix} 1/f_x & 0 & -c_x/f_x \\ 0 & 1/f_y & -c_y/f_y \\ 0 & 0 & 1 \\ 0 & 0 & 0 \end{bmatrix}.$$

Pc represents the perspective projection matrix of the second image, and Pm represents the perspective projection matrix of the template image. In the foregoing formula, points whose three-dimensional points are all z=1 are obtained through back projection of xm by using the camera parameters of the template image. However, because all the points are on the same plane, z=1 may be translated to z=0, and the foregoing formula does not change. However, at the same time, because z=0, all the points of the third column of R|T are 0, and may be deleted, to obtain a new equation as follows:

$$\begin{bmatrix} 1/f_x & 0 & -c_x/f_x \\ 0 & 1/f_y & -c_y/f_y \\ 0 & 0 & 1 \end{bmatrix} \begin{bmatrix} h_{00} & h_{01} & h_{02} \\ h_{10} & h_{11} & h_{12} \\ h_{20} & h_{21} & h_{22} \end{bmatrix} \begin{bmatrix} f_x & 0 & c_x \\ 0 & f_y & c_y \\ 0 & 0 & 1 \end{bmatrix} = s \begin{bmatrix} R_{00} & R_{01} & T_0 \\ R_{10} & R_{11} & T_1 \\ R_{20} & R_{21} & T_2 \end{bmatrix}$$

Therefore, $sR_{00}$, $sR_{10}$, $sR_{20}$ ... $sT_0$, $sT_1$, $sT_2$ may be obtained correspondingly.

Because R is a rotation matrix, the feature that the column vector is a unit matrix is met, so that the scale factor s may be obtained. R0 and R1 may be used to calculate the third column R2, and S and the third column of the left formula may be used to calculate T. The scale factor s has a plus or minus option. The position of the template image in the second image may be calculated after RT is calculated. From the fact that the position is definitely in the front of the camera (Tz<0), the symbol of s may be deduced, to obtain a set of determined rotation and translation matrixes, to obtain the determined camera pose information.

Third, in this embodiment of this application, the manner for calculating the first rotation and translation matrix and the second rotation and translation matrix are described. By using the foregoing manner, a more reliable calculation result may be obtained, and the practicability of the solution may be improved.

Optionally, on the basis of the sixth embodiment corresponding to FIG. 7, in an eighth optional embodiment of the method for determining camera pose information according to the embodiments of this application, the performing complementary filtering processing on the first rotation and translation matrix and the second rotation and translation matrix, to obtain the camera pose information may include:

inputting the first rotation and translation matrix to a low-pass filter, to obtain a first filtering result;

inputting the second rotation and translation matrix to a high-pass filter, to obtain a second filtering result; and determining the camera pose information according to the first filtering result and the second filtering result.

In this embodiment, the speed for obtaining the first rotation and translation matrix is relatively slow, the precision is relatively low, and an output result fluctuates around a correct value, and has a high-frequency error but a relatively stable average value. By comparison, the speed for obtaining the second rotation and translation matrix is relatively fast, the precision is relatively high, and the output result is more stable and smoother, and has no high-frequency jitter, but errors may be accumulated with the passage of time to generate drift. The first rotation and translation matrix and the second rotation and translation matrix are combined to just form a complementation. Therefore, the smooth output result may be obtained by performing complementary filtering.

It should be noted that, a low-pass filter and a high-pass filter may form complementary filters. In addition, a Kalman filter may also implement functions of the low-pass filter and the high-pass filter. The Kalman filter and the complementary filter are almost the same on the performance, but the complementary filter is simpler, and features of our application scenarios are closer to the complementary filter. Therefore, a similar idea is used to implement a visual complementary filter.

Figure 10:
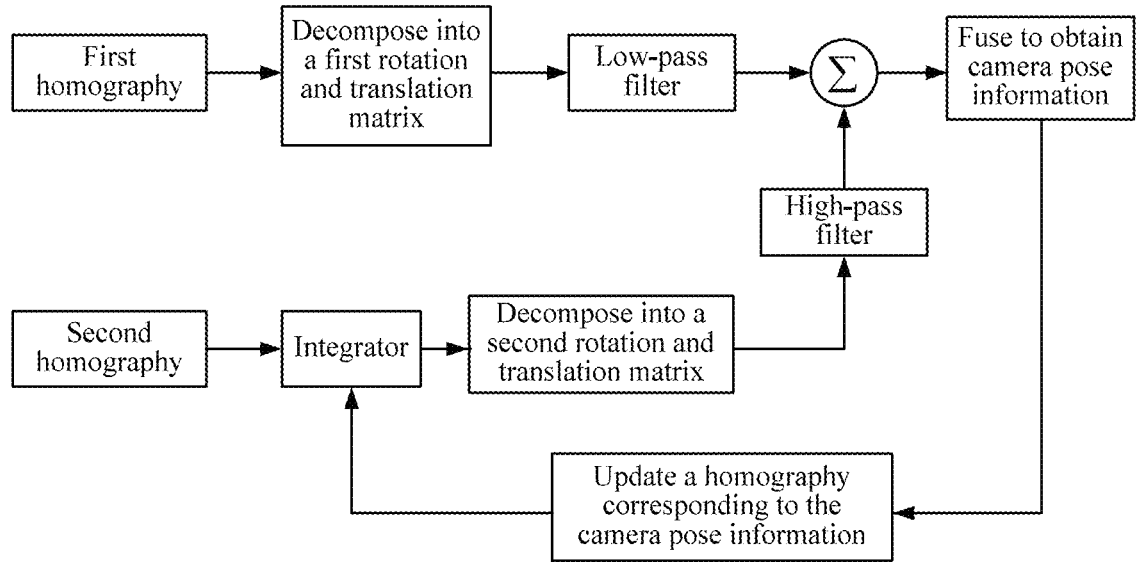
FIG. 10 is a schematic diagram of an embodiment of performing filtering processing on a first rotation and translation matrix and a second rotation and translation matrix according to an embodiment of this application.

For ease of description, referring to FIG. 10, FIG. 10 is a schematic diagram of an embodiment of performing filtering processing on a first rotation and translation matrix and a second rotation and translation matrix according to an embodiment of this application. As shown in the figure, a first homography represents a homography detected from a detector, and represents the transformation from a template image to a current camera image. The first homography may be directly decomposed into a first rotation and translation matrix (R1|T1). A second homography represents a homography tracked from a tracker, and also represents the transformation from the template image to the current image (that is, a second image), and the second homography may be decomposed into a second rotation and translation matrix (R2|T2). The first homography R1|T1 may filter high-frequency noise through a low-pass filter, to obtain a first filtering result (Rf1|Tf1); and the second homography R2|T2 filters low-frequency drift through a high-pass filter, to obtain a second filtering result (Rf2|Tf2).

The translation T is additive, and therefore may be directly fused. The rotation is directly additive. The Rodrigues' rotation formula needs to be first used to transform data into a quaternion, and is fused by using a spherical linear interpolation (slerp), to obtain filtered real data. The filtered real data describes the accurate rotation and translation (R|T) change from the template image to the current camera image.

Real coordinates of four vertexes of the template image in a coordinate system may be calculated by using the camera parameters, and may be multiplied by the foregoing R|T to calculate three-dimensional coordinates of the four vertexes of the template image on the corresponding current camera. Corresponding two-dimensional coordinates are calculated through perspective projection, to find four sets of matches of the template image to two-dimensional coordinate points on the current camera image, to obtain the updated homography through calculation. The homography is used to update an integrator, thereby eliminating the accumulated errors of the tracker.

It should be noted that, the complementary filtering provided in this embodiment is a frame, and the filtering can be performed not only on a tracking result obtained by the detector and an optical flow tracking result obtained by the tracker, but also on template image tracking results of any two or more different sources. Even data transmitted by an external sensor (for example, data measured by an inertia measurement unit) may also be processed correspondingly by using the Kalman filter.

Third, in this embodiment of this application, performing complementary filtering processing on the first rotation and translation matrix and the second rotation and translation matrix is inputting the first rotation and translation matrix to the low-pass filter, to obtain the first filtering result, also inputting the second rotation and translation matrix to the high-pass filter, to obtain the second filtering result, and finally, determining the camera pose information according to the first filtering result and the second filtering result. By using the foregoing manner, the disadvantages of low precision and high-frequency errors of the first rotation and translation matrix may be compensated, and the disadvantage that the second rotation and translation matrix generates drift due to the errors accumulated with the passage of time may be compensated. A smooth output result can be obtained by using the complementary filtering manner, thereby improving the feasibility of the solution.

Figure 11:
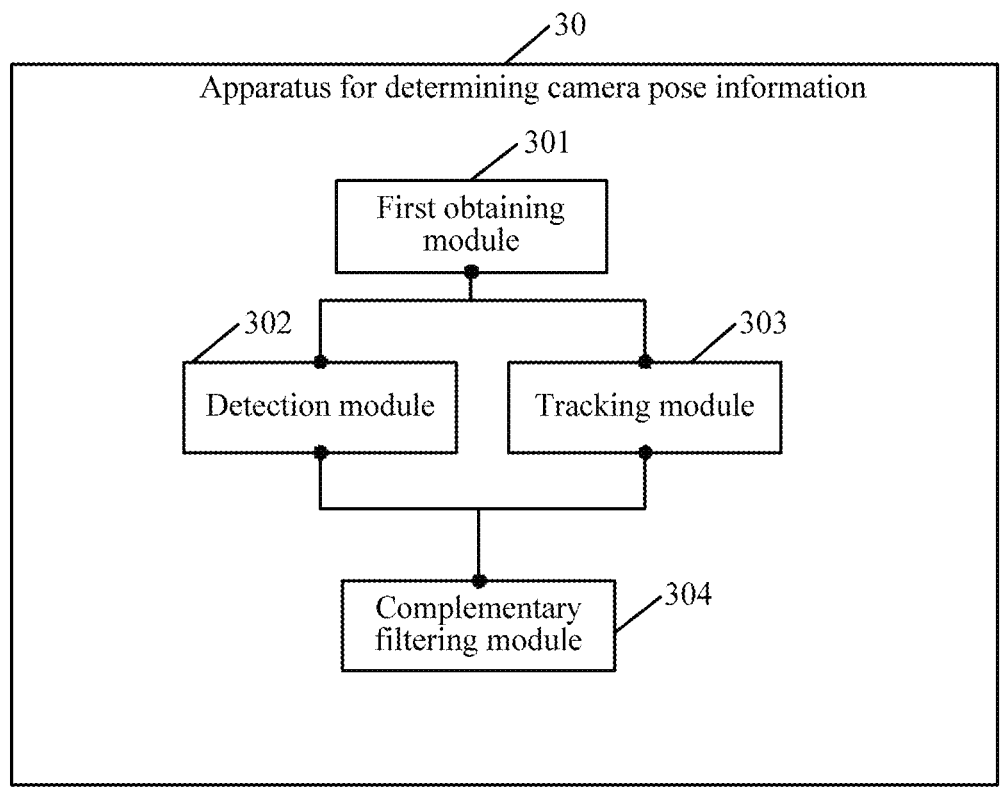
FIG. 11 is a schematic diagram of another embodiment of an apparatus for determining camera pose information according to the embodiments of this application.

The following describes the apparatus for determining camera pose information in this application in detail. FIG. 11 is a schematic diagram of an embodiment of the apparatus for determining camera pose information according to the embodiments of this application. The apparatus 30 for determining camera pose information includes:

a first obtaining module 301, configured to obtain a first image, a second image, and a template image, the first image being a previous frame of image of the second image, the first image and the second image being images collected by a camera, and the template image being a reference image used for matching;

a detection module 302, configured to perform feature point detection on a first feature point in the template image and a second feature point in the second image, to obtain a first homography;

a tracking module 303, configured to determine a second homography according to a first optical flow feature point in the first image and a first target homography in the second image, and according to the first target homography and a second target homography, the second target homography being a homography from the template image to the first image; and a complementary filtering module 304, configured to perform complementary filtering processing on the first homography and the second homography, to obtain camera pose information of the camera.

Figure 12:
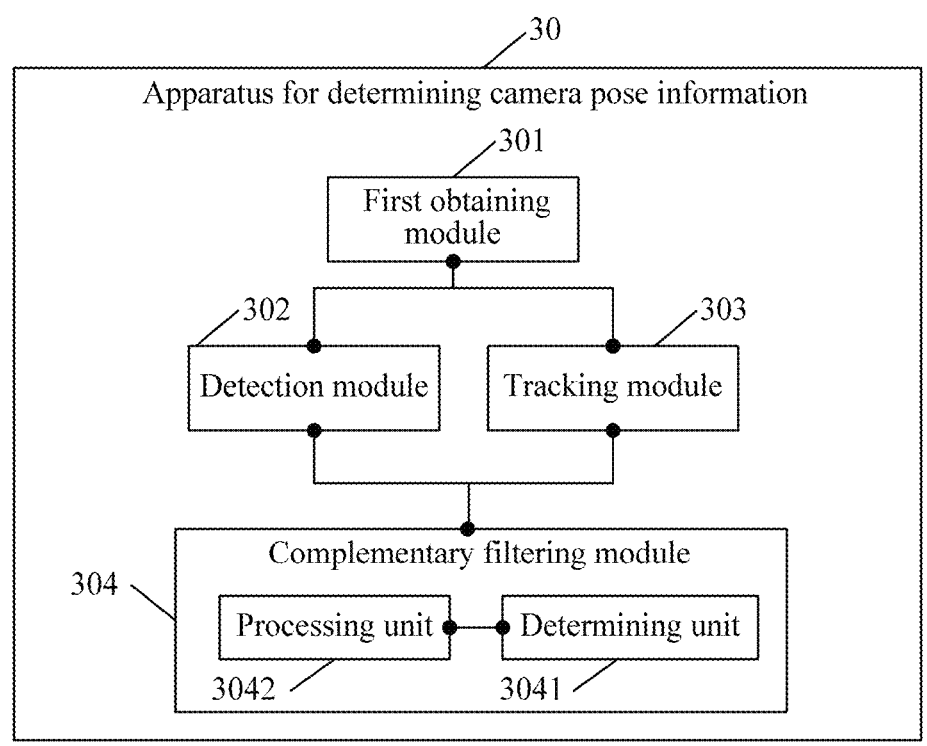
FIG. 12 is a schematic diagram of another embodiment of the apparatus for determining camera pose information according to the embodiments of this application.

In an optional embodiment based on FIG. 11, as shown in FIG. 12, the complementary filtering module 304 includes:

a determining unit 3041, configured to determine a first rotation and translation matrix according to the first homography, and determine a second rotation and translation matrix according to the second homography, the first homography and the second homography being two-dimensional information, and the first rotation and translation matrix and the second rotation and translation matrix being three-dimensional information; and a processing unit 3042, configured to perform complementary filtering processing on the first rotation and translation matrix and the second rotation and translation matrix, to obtain the camera pose information.

Figure 13:
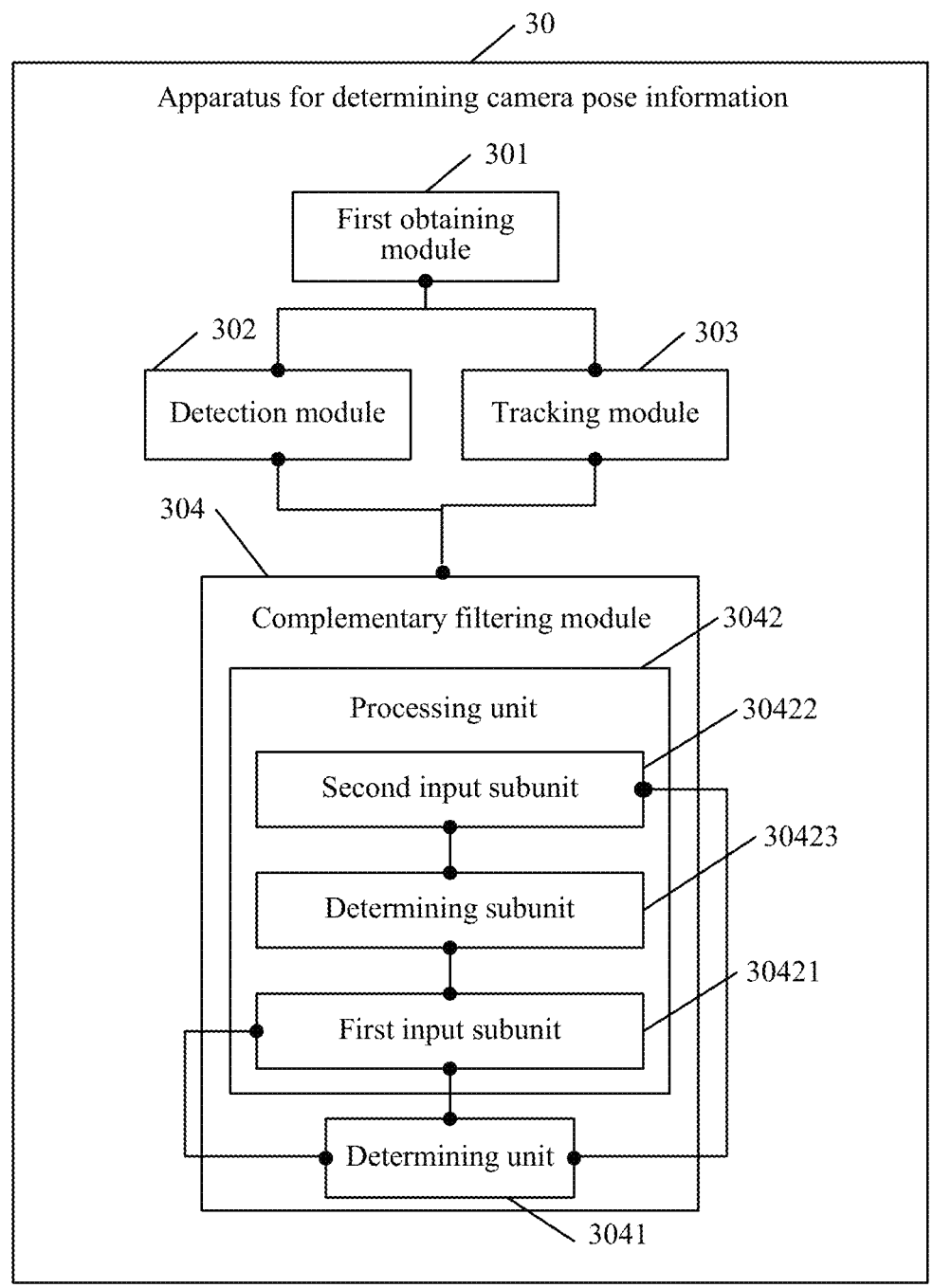
FIG. 13 is a schematic diagram of another embodiment of the apparatus for determining camera pose information according to the embodiments of this application.

In an optional embodiment based on FIG. 12, as shown in FIG. 13, the processing unit 3042 includes:

a first input subunit 30421, configured to input the first rotation and translation matrix to a low-pass filter, to obtain a first filtering result;

a second input subunit 30422, configured to input the second rotation and translation matrix to a high-pass filter, obtain a second filtering result; and a determining subunit 30423, configured to determine the camera pose information according to the first filtering result and the second filtering result.

Figure 14:
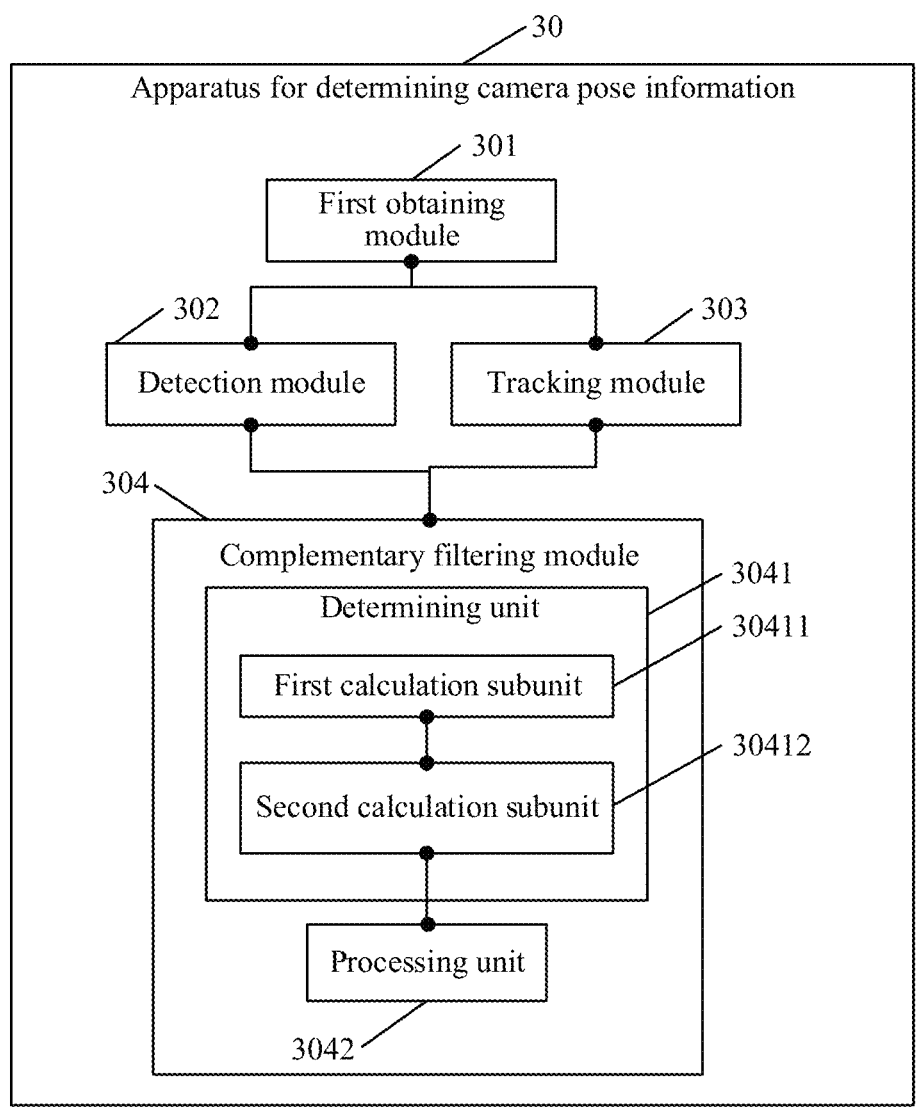
FIG. 14 is a schematic diagram of another embodiment of the apparatus for determining camera pose information according to the embodiments of this application.

In an optional embodiment based on FIG. 12, as shown in FIG. 14, the determining unit 3041 includes:

a first calculation subunit 30411, configured to calculate the first rotation and translation matrix according to the first homography, a perspective projection matrix of the second image, and a perspective projection matrix of the template image; and a second calculation subunit 30412, configured to calculate the second rotation and translation matrix according to the second homography, the perspective projection matrix of the second image, and the perspective projection matrix of the template image.

Figure 15:
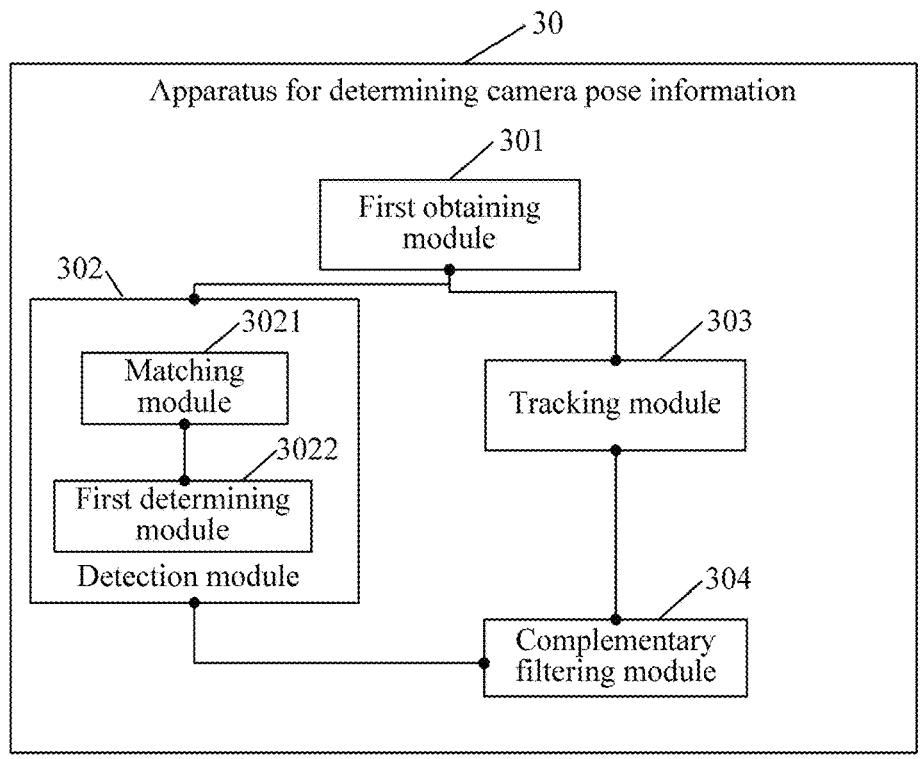
FIG. 15 is a schematic diagram of another embodiment of the apparatus for determining camera pose information according to the embodiments of this application.

In an optional embodiment based on FIG. 11, as shown in FIG. 15, the template image corresponds to a plurality of grids arranged in arrays; and the detection module 302 includes:

a matching module 3021, configured to match the first feature point in the template image with the second feature point in the second image, and determine a set of feature point pairs in each target grid of the plurality of grids, the feature point pair including: a first feature point located in the target grid, and a feature point that is in the second feature point and that has the largest matching degree with the first feature point; and a first determining module 3022, configured to calculate the first homography between the template image and the second image according to the feature point pairs in the target grid.

In an optional embodiment based on FIG. 15, the apparatus further includes:

a first extraction module, configured to extract the first feature point from each image layer of the template image, and determine the first feature point in an original image layer, the original image layer being an image layer of the template image, and the original image layer including the plurality of grids.

In an optional embodiment based on FIG. 15, the first extraction module includes:

a first extraction unit, configured to extract the first feature point from a first image layer of the template image;

a second extraction unit, configured to extract the first feature point from a second image layer of the template image, the first image layer and the second image layer having different sizes; and a projection unit, configured to perform scaling processing on the first feature point in the first image layer and the first feature point in the second image layer, and perform projection to the original image layer.

In an optional embodiment based on FIG. 15, the apparatus further includes:

a second extraction module, configured to extract the second feature point from the second image; and the matching unit including:

a matching unit, configured to match the first feature point in each target grid of the original image layer with the second feature point, and obtain at least one pair of mutually matched to-be-selected feature point pairs, each set of to-be-selected feature point pairs corresponding to a matching score; and a selection unit, configured to select a feature point pair having the highest matching score from the at least one pair of to-be-selected feature point pairs, as a feature point pair determined in the target grid.

Figure 16:
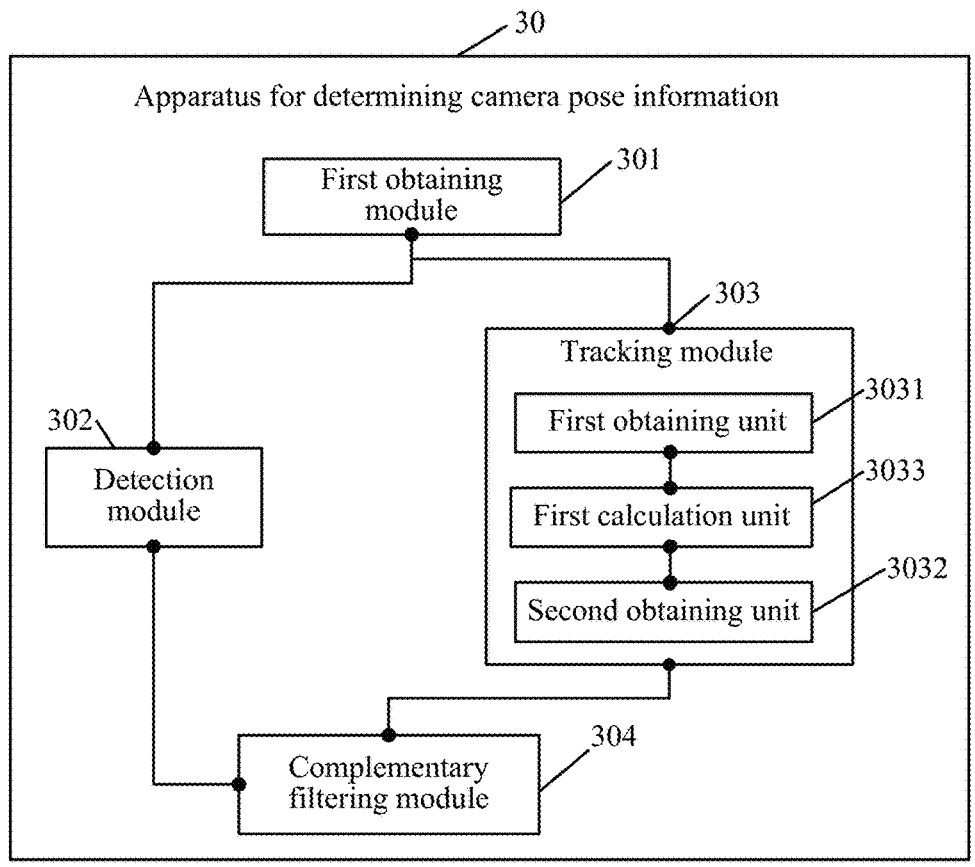
FIG. 16 is a schematic diagram of another embodiment of the apparatus for determining camera pose information according to the embodiments of this application.

In an optional embodiment based on FIG. 11, as shown in FIG. 16, the tracking module 303 includes:

a first obtaining unit 3031, configured to obtain the first optical flow feature point in a preset region of the first image, the preset region being a region corresponding to the template image;

a second obtaining unit 3032, configured to obtain the second optical flow feature point according to the first optical flow feature point; and a first calculation unit 3033, configured to calculate the first target homography from the first image to the second image according to the first optical flow feature point and the second optical flow feature point.

In an optional embodiment based on FIG. 15, the apparatus further includes:

a second obtaining module, configured to obtain q optical flow feature points as the second optical flow feature points if the quantity of the second optical flow feature points is less than a preset threshold, so that the quantity of the second optical flow feature points reaches the preset threshold, q being a positive integer.

Figure 17:
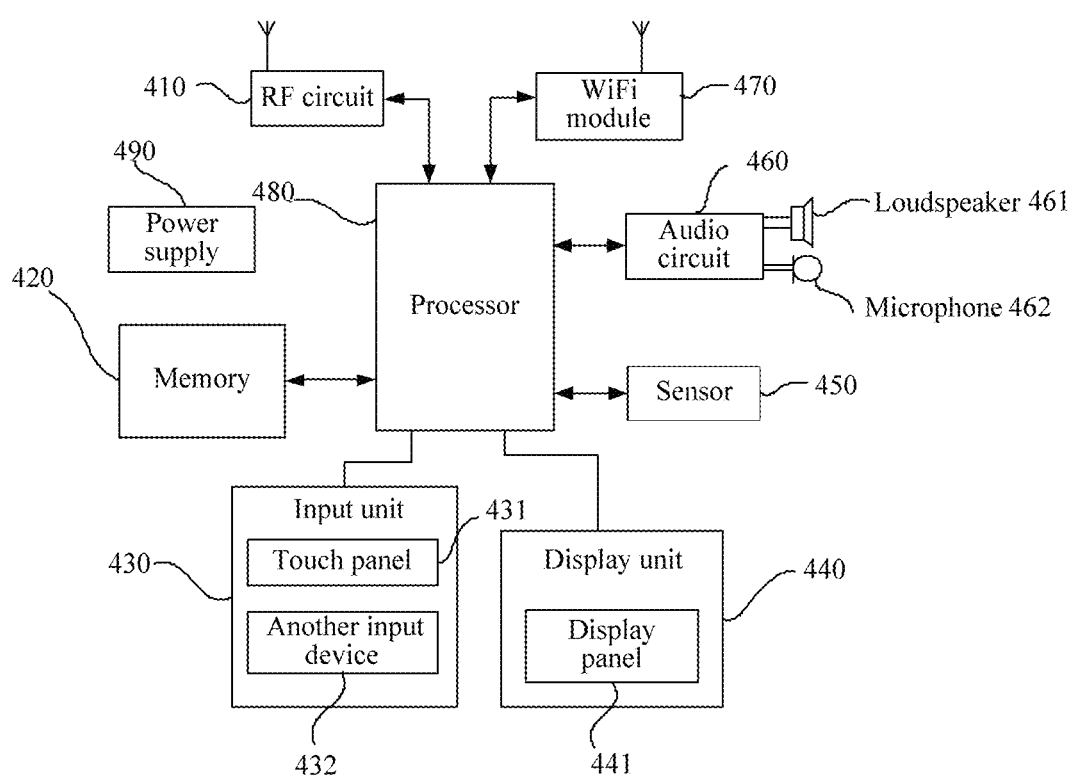
FIG. 17 is a schematic structural diagram of the apparatus for determining camera pose information according to the embodiments of this application.

The embodiments of this application further provide another apparatus for determining camera pose information, as shown in FIG. 17, and for ease of description, only parts related to the embodiments of this application are shown. For specific technical details that are not disclosed, refer to the method part of the embodiments of this application. The terminal may be any terminal device such as a mobile phone, a tablet computer, a PDA, a POS, or an in-vehicle computer. An example in which the terminal is a mobile phone is used.

FIG. 17 is a block diagram of a structure of a part of a mobile phone related to a terminal according to an embodiment of this application. Referring to FIG. 17, the mobile phone includes components such as a radio frequency (RF) circuit 410, a memory 420, an input unit 430, a display unit 440, a sensor 450, an audio circuit 460, a wireless fidelity (Wi-Fi) module 470, a processor 480, and a power supply 490. A person skilled in the art may understand that the structure of the mobile phone shown in FIG. 17 does not constitute a limitation to the mobile phone, and the mobile phone may include more components or fewer components than those shown in the figure, or some components may be combined, or a different component deployment may be used.

The following specifically describes the components of the mobile phone with reference to FIG. 17.

The RF circuit 410 may be configured to receive and send a signal during an information receiving and sending process or a call process. Specifically, the RF circuit receives downlink information from a base station, then delivers the downlink information to the processor 480 for processing, and sends related uplink data to the base station. Generally, the RF circuit 410 includes, but is not limited to, an antenna, at least one amplifier, a transceiver, a coupler, a low noise amplifier (LNA), and a duplexer. In addition, the RF circuit 410 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 420 may be configured to store a software program and module. The processor 480 runs the software program and module stored in the memory 420, to implement various functional applications and data processing of the mobile phone. The memory 420 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 420 may include a high speed random access memory, and may further include a non-volatile memory, such as at least one magnetic disk storage device, a flash memory, or other volatile solid-state storage devices.

The input unit 430 may be configured to receive input digit or character information, and generate a keyboard signal input related to the user setting and function control of the mobile phone. Specifically, the input unit 430 may include a touch panel 431 and another input device 432. The touch panel 431, which may also be referred to as a touch screen, may collect a touch operation of a user on or near the touch panel (such as an operation of a user on or near the touch panel 431 by using any suitable object or accessory such as a finger or a stylus), and drive a corresponding connection apparatus according to a preset program. Optionally, the touch panel 431 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 480. Moreover, the touch controller can receive and execute a command sent by the processor 480. In addition, the touch panel 431 may be implemented by using multiple types, such as a resistive, capacitive, infrared, or surface sound wave type touch panel. In addition to the touch panel 431, the input unit 430 may further include the another input device 432. Specifically, the another input device 432 may include, but is not limited to: one or more of a physical keyboard, a functional key (such as a volume control key or a switch key), a track ball, a mouse, and a joystick.

The display unit 440 may be configured to display information input by the user or information provided for the user, and various menus of the mobile phone. The display unit 440 may include a display panel 441. Optionally, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, so as to determine a type of a touch event. Then, the processor 480 provides corresponding visual output on the display panel 441 according to the type of the touch event. Although, in FIG. 17, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile phone may further include at least one sensor 450 such as an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 460, a loudspeaker 461, and a microphone 462 may provide audio interfaces between the user and the mobile phone. The audio circuit 460 may convert received audio data into an electric signal and transmit the electric signal to the loudspeaker 461. The loudspeaker 461 converts the electric signal into a sound signal for output. On the other hand, the microphone 462 converts a collected sound signal into an electric signal. The audio circuit 460 receives the electric signal and converts the electric signal into audio data, and outputs the audio data to the processor 480 for processing. Then, the processor 480 sends the audio data to, for example, another mobile phone by using the RF circuit 410, or outputs the audio data to the memory 420 for further processing.

Wi-Fi is a short distance wireless transmission technology. The mobile phone may help, by using the Wi-Fi module 470, the user to receive and send e-mails, browse a web page, access streaming media, and so on, which provides wireless broadband Internet access for the user. Although FIG. 17 shows the Wi-Fi module 470, it may be understood that the Wi-Fi module 470 is not a necessary component of the mobile phone, and when required, the Wi-Fi module 470 may be omitted as long as the scope of the essence of the present disclosure is not changed.

The processor 480 is the control center of the mobile phone, and is connected to various parts of the mobile phone by using various interfaces and lines. By running or executing the software program and/or module stored in the memory 420, and invoking data stored in the memory 420, the processor 480 performs various functions and data processing of the mobile phone, thereby performing overall monitoring on the mobile phone. Optionally, the processor 480 may include one or more processing units. Optionally, the processor 480 may integrate an application processor and a modem processor. The application processor mainly processes an operating system, a user interface, an application program, and the like. The modem processor mainly processes wireless communication. It may be understood that the foregoing modem processor may alternatively not be integrated into the processor 480.

The mobile phone further includes the power supply 490 (such as a battery) for supplying power to the components. Optionally, the power supply may be logically connected to the processor 480 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the memory 420 included in the terminal is configured to store a program, and the processor 480 is configured to execute the program in the memory 420 to implement the method for determining camera pose information according to the foregoing embodiments.

In this embodiment of this application, a computer readable storage medium is further provided, the computer readable storage medium storing instructions, and when being run in a computer, the instructions making the computer perform the method for determining camera pose information according to the foregoing embodiments.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the foregoing described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

If implemented in the form of software functional units and sold or used as an independent product, the integrated units may also be stored in a computer-readable storage medium. Based on such an understanding, the technical solutions of this application essentially, or the part contributing to the related technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely provided for describing the technical solutions of this application, but not intended to limit this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of this application.

What is claimed is:

1. A method for determining camera pose information of a camera of a mobile terminal having one or more processors and memory storing a plurality of instructions to be executed by the one or more processors, the method comprising:

obtaining a first image, a second image, and a template image, the first image being a previous frame of image of the second image, the first image and the second image being images including a respective instance of the template image captured by the mobile terminal using the camera at a corresponding spatial position, and the template image being a reference image used for matching;

determining a first homography between the template image and the second image;

determining a second homography between the first image and the second image; and performing complementary filtering processing on the first homography and the second homography, to obtain camera pose information of the camera, wherein the camera pose information of the camera represents a spatial position of the mobile terminal when the mobile terminal captures the second image using the camera.

2. The method according to claim 1, wherein the operation of performing complementary filtering processing on the first homography and the second homography, to obtain camera pose information of the camera comprises:

determining a first rotation and translation matrix according to the first homography, and determining a second rotation and translation matrix according to the second homography, the first homography and the second homography being two-dimensional information, and the first rotation and translation matrix and the second rotation and translation matrix being three-dimensional information; and performing complementary filtering processing on the first rotation and translation matrix and the second rotation and translation matrix, to obtain the camera pose information.

3. The method according to claim 2, wherein the operation of performing complementary filtering processing on the first rotation and translation matrix and the second rotation and translation matrix, to obtain the camera pose information comprises:

inputting the first rotation and translation matrix to a low-pass filter, to obtain a first filtering result;

inputting the second rotation and translation matrix to a high-pass filter, to obtain a second filtering result; and determining the camera pose information according to the first filtering result and the second filtering result.

4. The method according to claim 2, wherein the operation of determining a first rotation and translation matrix according to the first homography, and determining a second rotation and translation matrix according to the second homography comprises:

calculating the first rotation and translation matrix according to the first homography, a perspective projection matrix of the second image, and a perspective projection matrix of the template image; and calculating the second rotation and translation matrix according to the second homography, the perspective projection matrix of the second image, and the perspective projection matrix of the template image.

5. The method according to claim 1, wherein the template image corresponds to a plurality of grids arranged in arrays; and the operation of determining a first homography between the template image and the second image comprises:

matching a plurality of first feature points in the template image with a plurality of second feature points in the second image, and determining a set of feature point pairs in each target grid of the plurality of grids, the feature point pair comprising: a first feature point located in the target grid, and a corresponding second feature point that has the largest matching degree with the first feature point; and calculating the first homography between the template image and the second image according to the set of feature point pairs in the target grid.

6. The method according to claim 5, further comprising:

extracting the first feature point from each image layer of the template image, and determining the first feature point in an original image layer, the original image layer being an image layer of the template image, and the original image layer comprising the plurality of grids.

7. The method according to claim 6, wherein the operation of extracting the first feature point from each image layer of the template image, and determining the first feature point in an original image layer comprises:

extracting the first feature point from a first image layer of the template image;

extracting the first feature point from a second image layer of the template image, the first image layer and the second image layer having different sizes; and performing scaling processing on the first feature point in the first image layer and the first feature point in the second image layer, and performing projection to the original image layer.

8. The method according to claim 5, wherein the operation of matching a plurality of first feature points in the template image with a plurality of second feature points in the second image, and determining a set of feature point pairs in each target grid of the plurality of grids further comprises:

matching the first feature point in each of the target grid of the original image layer with the plurality of second feature points, and obtaining at least one pair of mutually matched to-be-selected feature point pairs, each set of the to-be-selected feature point pairs corresponding to a matching score; and selecting a feature point pair having the highest matching score from the at least one pair of to-be-selected feature point pairs, as a feature point pair determined in the target grid.

9. The method according to claim 1, wherein the operation of determining a second homography between the first image and the second image comprises:

obtaining a first optical flow feature point in a preset region of the first image, the preset region being a region including the corresponding instance of the template image;

obtaining a second optical flow feature point according to the first optical flow feature point; and calculating a first target homography from the first image to the second image according to the first optical flow feature point and the second optical flow feature point.

10. The method according to claim 9, further comprising:

determining the second homography between the first image and the second image according to the first target homography from the first image to the second image and a second target homography from the template image to the first image.

11. A mobile terminal having a camera, one or more processors, memory and a plurality of instructions stored in the memory that, when executed by the one or more processors, cause the mobile terminal to perform operations comprising:

obtaining a first image, a second image, and a template image, the first image being a previous frame of image of the second image, the first image and the second image being images including a respective instance of the template image captured by the mobile terminal using the camera at a corresponding spatial position, and the template image being a reference image used for matching;

determining a first homography between the template image and the second image;

determining a second homography between the first image and the second image; and performing complementary filtering processing on the first homography and the second homography, to obtain camera pose information of the camera, wherein the camera pose information of the camera represents a spatial position of the mobile terminal when the mobile terminal captures the second image using the camera.

12. The mobile terminal according to claim 11, wherein the operation of performing complementary filtering processing on the first homography and the second homography, to obtain camera pose information of the camera comprises:

determining a first rotation and translation matrix according to the first homography, and determining a second rotation and translation matrix according to the second homography, the first homography and the second homography being two-dimensional information, and the first rotation and translation matrix and the second rotation and translation matrix being three-dimensional information; and performing complementary filtering processing on the first rotation and translation matrix and the second rotation and translation matrix, to obtain the camera pose information.

13. The mobile terminal according to claim 12, wherein the operation of performing complementary filtering processing on the first rotation and translation matrix and the second rotation and translation matrix, to obtain the camera pose information comprises:

inputting the first rotation and translation matrix to a low-pass filter, to obtain a first filtering result;

inputting the second rotation and translation matrix to a high-pass filter, to obtain a second filtering result; and determining the camera pose information according to the first filtering result and the second filtering result.

14. The mobile terminal according to claim 12, wherein the operation of determining a first rotation and translation matrix according to the first homography, and determining a second rotation and translation matrix according to the second homography comprises:

calculating the first rotation and translation matrix according to the first homography, a perspective projection matrix of the second image, and a perspective projection matrix of the template image; and calculating the second rotation and translation matrix according to the second homography, the perspective projection matrix of the second image, and the perspective projection matrix of the template image.

15. The mobile terminal according to claim 11, wherein the template image corresponds to a plurality of grids arranged in arrays; and the operation of determining a first homography between the template image and the second image comprises:

matching a plurality of first feature points in the template image with a plurality of second feature points in the second image, and determining a set of feature point pairs in each target grid of the plurality of grids, the feature point pair comprising: a first feature point located in the target grid, and a corresponding second feature point that has the largest matching degree with the first feature point; and calculating the first homography between the template image and the second image according to the set of feature point pairs in the target grid.

16. The mobile terminal according to claim 11, wherein the operation of determining a second homography between the first image and the second image comprises:

obtaining a first optical flow feature point in a preset region of the first image, the preset region being a region including the corresponding instance of the template image;

obtaining a second optical flow feature point according to the first optical flow feature point; and calculating a first target homography from the first image to the second image according to the first optical flow feature point and the second optical flow feature point.

17. A non-transitory computer readable storage medium storing a plurality of instructions in connection with a mobile terminal having a camera, one or more processors, memory and a plurality of instructions stored in the memory that, when executed by the one or more processors, cause the mobile terminal to perform a plurality of operations including:

obtaining a first image, a second image, and a template image, the first image being a previous frame of image of the second image, the first image and the second image being images including a respective instance of the template image captured by the mobile terminal using the camera at a corresponding spatial position, and the template image being a reference image used for matching;

determining a first homography between the template image and the second image;

determining a second homography between the first image and the second image; and performing complementary filtering processing on the first homography and the second homography, to obtain camera pose information of the camera, wherein the camera pose information of the camera represents a spatial position of the mobile terminal when the mobile terminal captures the second image using the camera.

18. The non-transitory computer readable storage medium according to claim 17, wherein the operation of performing complementary filtering processing on the first homography and the second homography, to obtain camera pose information of the camera comprises:

determining a first rotation and translation matrix according to the first homography, and determining a second rotation and translation matrix according to the second homography, the first homography and the second homography being two-dimensional information, and the first rotation and translation matrix and the second rotation and translation matrix being three-dimensional information; and performing complementary filtering processing on the first rotation and translation matrix and the second rotation and translation matrix, to obtain the camera pose information.

19. The non-transitory computer readable storage medium according to claim 18, wherein the operation of performing complementary filtering processing on the first rotation and translation matrix and the second rotation and translation matrix, to obtain the camera pose information comprises:

inputting the first rotation and translation matrix to a low-pass filter, to obtain a first filtering result;

inputting the second rotation and translation matrix to a high-pass filter, to obtain a second filtering result; and determining the camera pose information according to the first filtering result and the second filtering result.

20. The non-transitory computer readable storage medium according to claim 18, wherein the operation of determining a first rotation and translation matrix according to the first homography, and determining a second rotation and translation matrix according to the second homography comprises:

calculating the first rotation and translation matrix according to the first homography, a perspective projection matrix of the second image, and a perspective projection matrix of the template image; and calculating the second rotation and translation matrix according to the second homography, the perspective projection matrix of the second image, and the perspective projection matrix of the template image.

\* \* \* \* \*